(12) United States Patent
Li et al.

(10) Patent No.: US 8,693,304 B2
(45) Date of Patent: Apr. 8, 2014

(54) OFFSETTING BEACON POSITIONS IN A TIME DIVISION DUPLEX COMMUNICATION SYSTEM

(75) Inventors: Junyi Li, Bedminster, NJ (US); Arnab Das, Summit, NJ (US); Rajiv Laroia, Far Hills, NJ (US)

(73) Assignee: QUALCOMM Incorporated, San Diego, CA (US)

(*) Notice: Subject to any disclaimer, the term of this patent is extended or adjusted under 35 U.S.C. 154(b) by 1590 days.

(21) Appl. No.: 11/857,761

(22) Filed: Sep. 19, 2007

(65) Prior Publication Data

US 2011/0116358 A9    May 19, 2011

Related U.S. Application Data

(63) Continuation-in-part of application No. 11/266,643, filed on Nov. 3, 2005, now Pat. No. 7,720,479, which is a continuation of application No. 10/964,908, filed on Oct. 14, 2004, now Pat. No. 6,993,333, application No. 11/857,761, which is a continuation of application No. 10/642,096, filed on Aug. 14, 2003, now Pat. No. 7,366,200, which is a continuation-in-part of application No. 10/641,399, filed on Aug. 13, 2003, now Pat. No. 6,985,498.

(60) Provisional application No. 60/845,939, filed on Sep. 19, 2006, provisional application No. 60/511,964, filed on Oct. 16, 2003, provisional application No. 60/406,076, filed on Aug. 26, 2002.

(51) Int. Cl.
*H04J 11/00* (2006.01)

(52) U.S. Cl.
USPC .......................................................... 370/203

(58) Field of Classification Search
USPC ......... 370/203, 318, 478, 331, 343, 347, 350, 370/229, 312
See application file for complete search history.

(56) References Cited

U.S. PATENT DOCUMENTS 6,201,802 B1 * 3/2001 Dean ............................. 370/350
6,795,424 B1 * 9/2004 Kapoor et al. ................ 370/343

(Continued)

FOREIGN PATENT DOCUMENTS

WO       2005038606        4/2005
WO       WO2005/041448  *  5/2005  ............... H04B 7/26

(Continued)

OTHER PUBLICATIONS

International Search Report—PCT/US07/078799, International Search Authority—European Patent Office—Jan. 24, 2008.

(Continued)

*Primary Examiner* — Mark Rinehart
*Assistant Examiner* — Gbemileke Onamuti
(74) *Attorney, Agent, or Firm* — Joseph B. Agusta

(57) ABSTRACT

Systems and methodologies are described that facilitate generating and/or analyzing downlink transmission units in OFDM TDD environments. Beacon signals may be selectively inserted within downlink transmission units; for example, the position of Beacon signals may vary from cell to cell. Further, the position may be a function of a characteristic of a cell (e.g., cell identifier) and/or an expected drift. Moreover, a Beacon signal may be interjected at a location in a downlink transmission unit so as to mitigate alignment with disparate Beacon signals in downlink transmission units associated with differing cells. Additionally, an identity of a cell providing downlink transmission units may be determined by analyzing a position of the Beacon signal within the downlink transmission units.

33 Claims, 17 Drawing Sheets

(56) References Cited

U.S. PATENT DOCUMENTS

| | | |
|---|---|---|
| 6,985,498 B2 * | 1/2006 | Laroia et al. ............ 370/478 |
| 6,993,333 B2 | 1/2006 | Laroia et al. |
| 7,042,858 B1 * | 5/2006 | Ma et al. ............... 370/331 |
| 7,315,523 B2 * | 1/2008 | Cai et al. ............... 370/312 |
| 7,436,758 B2 * | 10/2008 | Suh et al. .............. 370/203 |
| 7,443,830 B2 * | 10/2008 | Engels et al. ........... 370/347 |
| 7,567,502 B2 | 7/2009 | Laroia et al. |
| 2002/0159430 A1 * | 10/2002 | Atarashi et al. ......... 370/347 |
| 2004/0179627 A1 * | 9/2004 | Ketchum et al. ......... 375/267 |
| 2005/0085265 A1 * | 4/2005 | Laroia et al. ........... 455/560 |
| 2005/0099942 A1 * | 5/2005 | Kurihara ................ 370/229 |
| 2006/0083211 A1 | 4/2006 | Laroia et al. |
| 2007/0053315 A1 * | 3/2007 | Sugaya ................. 370/318 |

FOREIGN PATENT DOCUMENTS

| | | | | |
|---|---|---|---|---|
| WO | WO 2005041448 A1 * | 5/2005 | ............ | H04B 7/26 |
| WO | 2005109657 | 11/2005 | | |
| WO | 2007047502 | 4/2007 | | |

OTHER PUBLICATIONS

Written Opinion—PCT/US07/078799, International Search Authority—European Patent office—Jan. 24, 2008.

* cited by examiner

OFFSETTING BEACON POSITIONS IN A TIME DIVISION DUPLEX COMMUNICATION SYSTEM

CROSS-REFERENCE TO RELATED APPLICATIONS

This application is a continuation in part of U.S. patent application Ser. No. 11/266,643, filed Nov. 3, 2005 now U.S. Pat. No. 7,720,479 which is a continuation of U.S. patent application Ser. No. 10/964,908, filed Oct. 14, 2004 which issued as U.S. Pat. No. 6,993,333 and which claims the benefit of U.S. Provisional Patent Application Ser. No. 60/511,964 filed Oct. 16, 2003; and this application is also a continuation in part of U.S. patent application Ser. No. 10/642,096, filed Aug. 14, 2003 now U.S. Pat. No. 7,366,200 which is a continuation in part of U.S. patent application Ser. No. 10/641,399, filed Aug. 13, 2003 which issued as U.S. Pat. No. 6,985,498 and which claims the benefit of U.S. Provisional Patent Application Ser. No. 60/406,076 filed Aug. 26, 2002; and this application claims the benefit of U.S. Provisional Patent application Ser. No. 60/845,939 entitled "OFFSETTING BEACON POSITION IN A TIME DIVISION DUPLEX COMMUNICATIONS" which was filed Sep. 19, 2006. The entirety of the aforementioned application Ser. No. 60/845,939 is herein incorporated by reference.

BACKGROUND

I. Field

The following description relates generally to wireless communications, and more particularly to selectively inserting Beacon signals in downlink transmission units in a wireless communication system.

II. Background

Wireless communication systems are widely deployed to provide various types of communication; for instance, voice and/or data may be provided via such wireless communication systems. A typical wireless communication system, or network, can provide multiple users access to one or more shared resources. For instance, a system may use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Common wireless communication systems employ one or more base stations that provide a coverage area. A typical base station can transmit multiple data streams for broadcast, multicast and/or unicast services, wherein a data stream may be a stream of data that can be of independent reception interest to a wireless terminal. A wireless terminal within the coverage area of such base station can be employed to receive one, more than one, or all the data streams carried by the composite stream. Likewise, a wireless terminal can transmit data to the base station or another wireless terminal.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

In a time division duplex (TDD) system, the air interface resource may be used alternately as downlink and uplink transmission units with guard time intervals being added in-between. A downlink transmission unit represents a time interval in which the downlink signal is sent, and an uplink transmission unit represents a time interval in which the uplink signal is sent. In the TDD system, the downlink and uplink transmission units are interleaved with each other. When a TDD system is deployed in a cellular environment, the downlink and uplink transmission units of base stations may be synchronized; accordingly, when one base station is in downlink transmission other base stations may also be in downlink transmission, and when one base station is in uplink transmission other base stations may also be in uplink transmission. Since downlink transmission units from disparate base stations may be synchronized, control data such as Beacons and the like may be simultaneously transmitted by each of the disparate base stations; thus, a mobile device may encounter difficulty associated with discerning control data (e.g., Beacon signals) provided from differing base stations (e.g., disparate cells) at common times.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating generation and/or analysis of downlink transmission units in OFDM TDD environments. A downlink transmission unit includes a number of non-strip OFDM symbols, and may furthermore include one or multiple strip OFDM symbols. While the non-strip OFDM symbols are used to transmit data and control signals, the strip OFDM symbols are mainly used to transmit control signals (e.g., broadcast control signals). A tone hopping scheme is used in the non-strip OFDM symbols to average inter-cell interference and achieve frequency diversity. The tone hopping scheme is not used in the strip OFDM symbols. The operation of coding and modulation in the strip OFDM symbols is done independently of that in the non-strip OFDM symbols. Different types of transmission units are used. A first type of transmission unit includes only non-strip OFDM symbols. A second type of transmission unit is constructed by adding strip OFDM symbols to the first type, in which case the second type of transmission unit has the same number of non-strip OFDM symbols as the first type transmission unit and the tone hopping scheme used in the non-strip symbols of the first and the second type transmission units is the same. Beacon signals may be selectively inserted within the second type downlink transmission units; for example, the position of Beacon signals may vary from cell to cell. Further, the position may be a function of a characteristic of a cell (e.g., cell identifier) and/or an expected drift. Moreover, a Beacon signal may be interjected at a location in a downlink transmission unit so as to mitigate alignment with disparate Beacon signals in downlink transmission units associated with differing cells. Additionally, an identity of a cell providing downlink transmission units may be determined by analyzing a position of the Beacon signal within the downlink transmission units.

According to related aspects, a method that facilitates generating downlink transmission units in an Orthogonal Frequency Division Multiplexing (OFDM) time division duplex (TDD) environment is described herein. The method may include selectively positioning a Beacon signal within a downlink transmission unit based upon a characteristic of a cell. Further, the method may comprise transmitting the downlink transmission unit.

Another aspect relates to a wireless communications apparatus. The wireless communications apparatus may include a memory that retains instructions for determining a time location for a Beacon signal within a downlink transmission unit, determining a subband position for the Beacon signal, and sending the Beacon signal with the time location and the subband position via a downlink. Moreover, the wireless communications apparatus may comprise a processor, coupled to the memory, configured to execute the instructions retained in the memory.

Yet another aspect relates to a wireless communications apparatus that generates downlink transmission units in an OFDM TDD environment. The wireless communications apparatus may include means for selectively interposing a Beacon signal in a downlink transmission unit to mitigate alignment with a disparate Beacon signal between cells; and means for transferring the downlink transmission unit via a downlink.

Still another aspect relates to a machine-readable medium having stored thereon machine-executable instructions for selectively positioning strip OFDM symbols in downlink transmission units, selectively carrying a Beacon signal with a subset of the strip OFDM symbols in the downlink transmission units based upon a characteristic of a cell, and sending the downlink transmission units over a downlink.

In accordance with another aspect, an apparatus in a wireless communication system may include a processor, wherein the processor may be configured to selectively position a Beacon signal within downlink transmission units so as to mitigate alignment with a disparate Beacon signal associated with a disparate cell. Further, the processor may be configured to transfer the downlink transmission units over a downlink.

According to other aspects, a method that facilitates analyzing downlink transmission units in an OFDM TDD environment is described herein. The method may include receiving downlink transmission units from a base station associated with a cell. Further, the method may include analyzing a time position of a Beacon signal included in the downlink transmission units. Moreover, the method may include determining an identity of the cell based upon the time position.

Yet another aspect relates to a wireless communications apparatus that may include a memory that retains instructions for obtaining downlink transmission units that include a Beacon signal from a cell and evaluating a position of the Beacon signal within the downlink transmission units to yield an identity of the cell. Further, the wireless communications apparatus may include a processor, coupled to the memory, configured to execute the instructions retained in the memory.

Another aspect relates to a wireless communications apparatus that employs a downlink transmission unit that includes a Beacon signal in an OFDM TDD environment. The wireless communications apparatus may include means for obtaining a downlink transmission unit; and means for evaluating a Beacon signal selectively interjected within the downlink transmission unit as a function of a cell identifier.

Still another aspect relates to a machine-readable medium having stored thereon machine-executable instructions for receiving downlink transmission units from a plurality of cells, the downlink transmission units include Beacon signals positioned according to characteristics of respective cells, and determining identities of each of the plurality of cells from which the downlink transmission units are obtained based upon positions of the Beacon signals.

In accordance with another aspect, an apparatus in a wireless communication system may include a processor, wherein the processor may be configured to obtain downlink transmission units from a base station associated with a cell. Moreover, the processor may be configured to evaluate a time position of a Beacon signal included in the downlink transmission units. Further, the processor may be configured to determine an identity of the cell based upon the time position.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
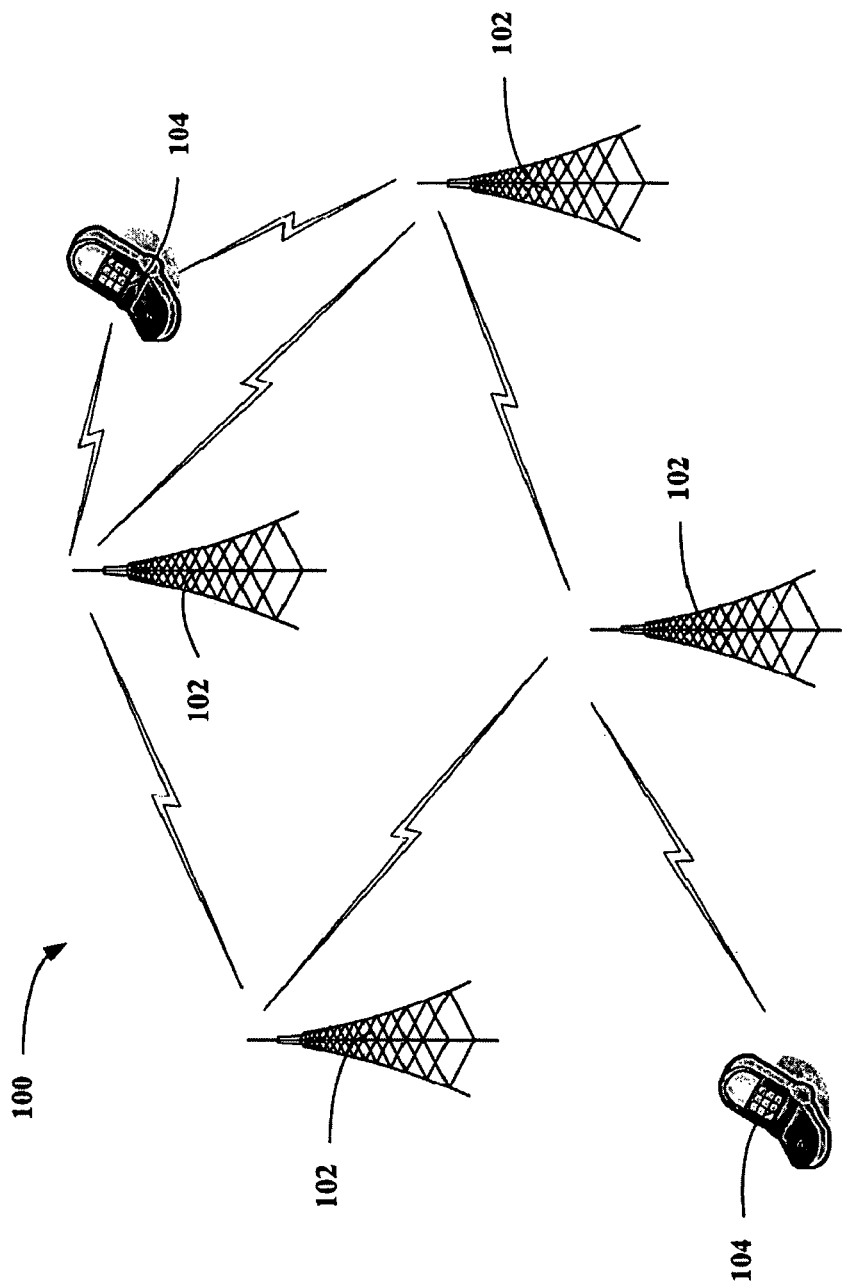
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device may be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station may be utilized for communicating with mobile device(s) and may also be referred to as an access point, Node B, or some other terminology.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 may comprise one or more base stations 102 (e.g., access points) in one or more sectors that receive, transmit, repeat, etc., wireless communication signals to each other and/or to one or more mobile devices 104. Each base station 102 can comprise a transmitter chain and a receiver chain, each of which can in turn comprise a plurality of components associated with signal transmission and reception (e.g., processors, modulators, multiplexers, demodulators, demultiplexers, antennas, . . . ) as will be appreciated by one skilled in the art. Mobile devices 104 can be, for example, cellular phones, smart phones, laptops, handheld communication devices, handheld computing devices, satellite radios, global positioning systems, PDAs, and/or any other suitable device for communicating over wireless communication system 100.

Base stations 102 may each communicate with one or more mobile devices 104. Base stations 102 may transmit information to mobile devices 104 over a forward link (downlink) and receive information from mobile devices 104 over a reverse link (uplink). Further, system 100 may be a time division duplex (TDD) system; thus, the forward link and the reverse link may utilize a common frequency band. In the TDD system, the downlink and uplink transmission signals alternately share the common frequency band, with guard time intervals being added in-between. A downlink transmission unit represents a time interval in which the downlink signal is sent, and an uplink transmission unit represents a time interval in which the uplink signal is sent. Moreover, system 100 may be synchronized when employing TDD such that base stations 102 receive uplink transmission units (UL TU) from mobile devices 104 during a first set of times and mobile devices 104 receive downlink transmission units (DL TU) from base stations 102 during a second set of times. According to an example, mobile devices 104 may transmit on the uplink to base stations 102 (e.g., transmit uplink transmission units), followed by a gap in time (e.g., guard time interval), and then base stations 102 may transmit on the downlink to mobile devices 104 (e.g., transmit downlink transmission units), followed by another gap in time (e.g., guard time interval), and so forth.

In accordance with an example, a downlink (or uplink) transmission unit includes any number of non-strip OFDM symbols. Further, a downlink transmission unit may include one or multiple strip OFDM symbols. Non-strip OFDM symbols are commonly utilized to transmit data and controls signals (e.g., via traffic channel(s) and/or control channel(s)). Additionally, strip OFDM symbols may be employed to transmit control signals (e.g., broadcast control signals, Beacon signals, . . . ). A tone hopping scheme may be used in connection with the non-strip OFDM symbols to average inter-cell interference and enable frequency diversity. Further, the same tone hopping scheme may not be utilized in connection with the strip OFDM symbols. Tone hopping may or may not be utilized in the strip OFDM symbols. Moreover, operation of coding and modulation in the strip OFDM symbols may be independent of that in the non-strip OFDM symbols.

Different types of transmission units are used in system 100. A first type of transmission unit includes only non-strip OFDM symbols. A second type of transmission unit is constructed by adding strip OFDM symbols to the first type. According to an example, the second type of transmission unit can have the same number of non-strip OFDM symbols as the first type of transmission unit and the tone hopping scheme used in the non-strip symbols of the first and the second type transmission units can be the same.

In a TDD system (e.g., system 100) with synchronized cells, a strip channel of one cell (e.g., associated with one of the base stations 102) may interfere with a strip channel of a disparate cell (e.g., associated with a differing one of the base stations 102), which may not be desired from an interference averaging perspective. Such interference may be mitigated by base stations 102 selectively positioning the strip OFDM symbols within downlink transmission units transferred to mobile devices 104. Further, the position of the strip OFDM symbol may vary from one cell to another (e.g., at least in a local area). For example, the position may be determined as a function of a physical layer identifier corresponding to each cell (e.g., cell identifier), which may be assigned locally unique when system 100 is deployed. Pursuant to another example, in a given cell, the position of the strip OFDM symbol within a downlink transmission unit may vary over time.

Strip OFDM symbols may be utilized to transfer Beacon signals from base stations 102 to mobile devices 104. However, each strip OFDM symbol need not carry a Beacon signal; rather, a subset of strip OFDM symbols may include Beacon signals (e.g., one out of every 8 strip OFDM symbols may carry Beacon signals, . . . ). Pursuant to an example, time position associated with Beacon signal transmission when a cell is in downlink mode may vary from one cell to another (e.g., at least in a local area). According to a further illustration, the spectrum may be divided into a plurality of frequency subbands and the Beacon signal may be transmitted sequentially in any one of the subbands. Thus, the combination of the time position and subband position may mitigate collisions of Beacon signals from neighboring cells. Moreover, for example, the time position and/or subband position may be determined as a function of a characteristic of a cell (e.g., physical layer identifier of a cell, cell identifier, . . . ); for instance, the physical layer identifier may be assigned locally unique to a cell when the network is deployed. Further, based upon the time location of strip OFDM symbols and/or Beacon signals within downlink transmission units, mobile devices 104 may determine the identity of base stations 102 that transmitted each of the downlink transmission units.

By utilizing differing time positions and/or subband positions for Beacon signal transfer in downlink transmission units, Beacon signal alignment from disparate cells may be mitigated. In contrast, conventional techniques oftentimes enable simultaneous transmission of Beacon signals from disparate cells in TDD systems. Thus, Beacon signals from different cells may commonly interfere with each other, thereby increasing difficulty associated with discerning Beacon signals from the different cells. For example, a relatively weak Beacon signal from a first cell may be difficult to utilize when a comparatively strong Beacon signal from a second cell is concurrently obtained at mobile device 104. However, the relatively weak Beacon signal (e.g., discerned by mitigating Beacon signal alignment) may be employed to enable robust handoffs, since detection of the presence of a cell may be effectuated through the relatively weak Beacon signal.

Figure 2:
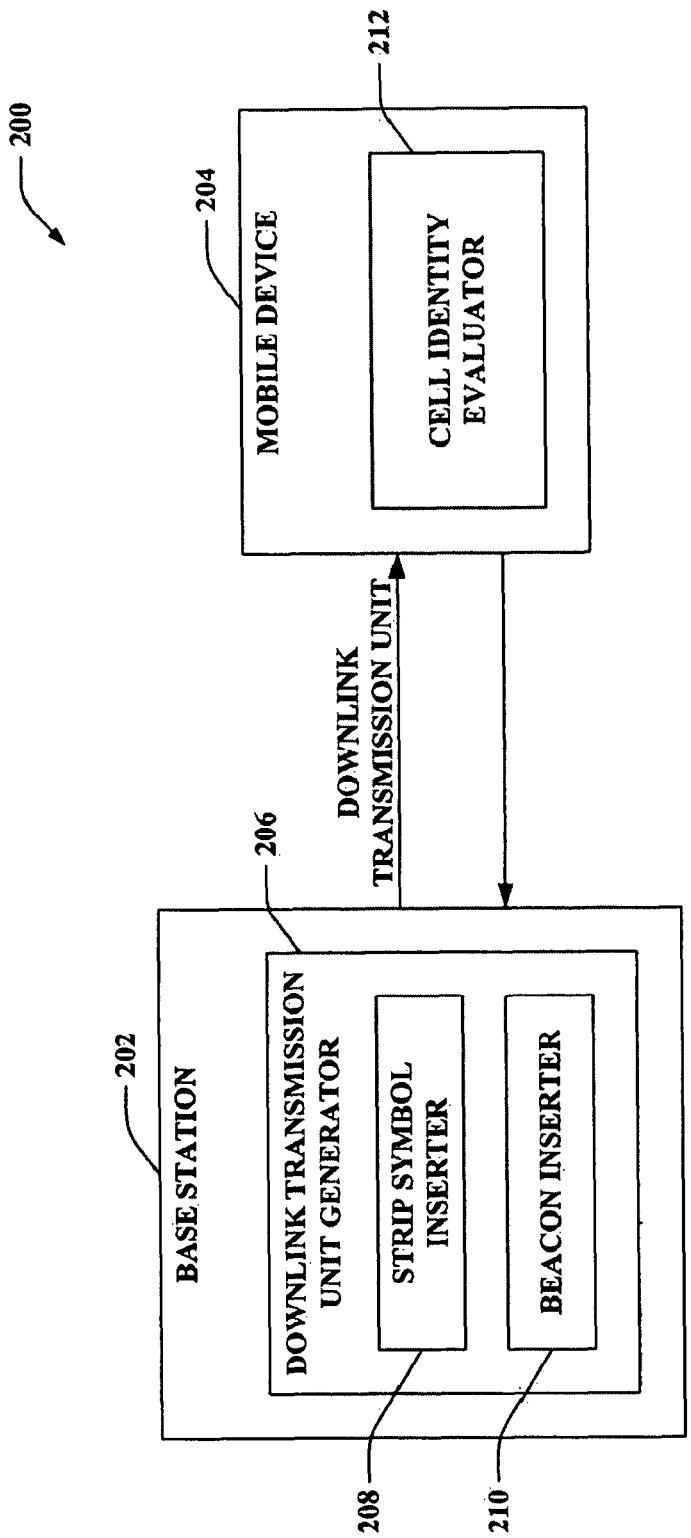
FIG. 2 is an illustration of an example wireless communications system that constructs downlink transmission units for transfer within a wireless communication environment.

Now turning to FIG. 2, illustrated is a system 200 that constructs downlink transmission units for transfer within a wireless communication environment. System 200 includes a base station 202 that communications with a mobile device 204 (and/or any number of disparate mobile devices (not shown)). Base station 202 may comprise a downlink transmission unit generator 206 that yields downlink transmission unit(s) for transfer to mobile device 204. Downlink transmission unit generator 206 may yield unique downlink transmission units for communication to mobile device 204 and/or any disparate mobile devices. Moreover, base station 202 may obtain uplink transmission unit(s) from mobile device 204 (and/or any disparate mobile devices).

Downlink transmission unit generator 206 may create distinct types of downlink transmission units. For example, downlink transmission unit generator 206 may yield a first type of downlink transmission unit (e.g., type 0 downlink transmission unit) that includes only non-strip OFDM symbols. Pursuant to an illustration, downlink transmission unit generator 206 may include N non-strip OFDM symbols in type 0 downlink transmission units, where N may be any integer. Further to this illustration, N may be 31; however, the claimed subject matter is not so limited. Additionally, downlink transmission unit generator 206 may create a second type of downlink transmission unit (e.g., type 1 downlink transmission unit) that includes non-strip OFDM symbols and one or more strip OFDM symbols. Type 1 downlink transmission units generated by downlink transmission unit generator 206 may include N non-strip OFDM symbols, where N may be any integer (e.g., N may be 31, . . . ), and M strip OFDM symbols, where M may be any integer (e.g., M may be 1, . . . ). Pursuant to an example, the number of non-strip OFDM symbols in the type 0 and type 1 transmission units can be the same. Moreover, the tone hopping scheme used in the non-strip OFDM symbols of the type 0 and type 1 transmission units can be the same. The tone hopping scheme can be symbol-by-symbol hopping in which the physical tone(s) of a logical channel hop every OFDM symbol, or block-based hopping in which the physical tone(s) of a logical channel hop every a few OFDM symbols, or mixed symbol-by-symbol and blocked based hopping.

Downlink transmission unit generator 206 may further include a strip symbol inserter 208 that selectively positions strip OFDM symbol(s) within downlink transmission units (e.g., type 1 downlink transmission units) yielded by downlink transmission unit generator 206. For example, strip symbol inserter 208 may arrange the strip OFDM symbol at a fixed position (e.g., at the beginning of the transmission unit) and allow the non-strip OFDM symbols to fill the remaining positions. Strip symbol inserter 208 may selectively incorporate the strip OFDM symbols into the downlink transmission unit at varying positions as a function of cell identity (e.g., employing a physical layer identifier corresponding to a cell). By employing strip symbol inserter 208, alignment of strip OFDM symbols between disparate cells may be mitigated—thus, resultant interference associated with strip OFDM symbols from differing cells being transmitted at a common time may be reduced. Further, strip symbol inserter 208 may space the strip OFDM symbols as a function of expected drift.

According to one or more aspects, a strip OFDM symbol may comprise, for example, 113 tones, 56 of which may be utilized to transmit data, training information, etc., and have a non-zero energy associated with them. Further, the remaining tones are non-zero energy tones, known as null tones, that do not carry any signal transmission energy. However, the claimed subject matter is not so limited to the foregoing description of strip OFDM symbols.

Further, downlink transmission unit generator 206 may include a beacon inserter 210. Beacon inserter 210 may selectively incorporate Beacon signals at varying locations in downlink transmission units as a function of characteristics of cells (e.g., cell identifiers), expected drift, and so forth. Further, beacon inserter 210 may interject the Beacon signal to mitigate alignment with Beacon signal(s) included in downlink transmission units associated with differing cells. By way of illustration, beacon inserter 210 may enable including Beacon signals in a subset of the strip OFDM symbols selectively positioned by strip symbol inserter 208; for example, out of a set of F strip OFDM symbols, G of the strip OFDM symbols may carry Beacon signals, where F and G may be any integers. According to another example, beacon inserter 210 may determine subband positions to be employed in connection with each of the Beacon signals in the downlink transmission units.

Pursuant to an example, a strip OFDM symbol may be utilized to carry a Beacon signal, where a majority of transmission power is concentrated upon 1 tone; for instance, the per-tone transmission power of the Beacon signal may be much higher (e.g., 10, db, 15 db, 20 db, x db, . . . ) than an average per-tone transmission power associated with other OFDM symbols. Due to the higher transmission power, Beacon signals may be received by remotely located mobile devices (e.g., mobile device 204) and may be utilized for system acquisition and handoff. For example, mobile devices (e.g., mobile device 204) can utilize the Beacon signal to identify the cell and measure the channel gain from the cell. However, since Beacon signals tend to be peaky, difficulty is encountered when differentiating between Beacon signals from disparate base stations obtained at substantially similar times; thus, beacon inserter 210 may enable selectively spacing Beacon signals to mitigate Beacon signal overlap from different cells.

Mobile device 204 may further include a cell identity evaluator 212 that may analyze received downlink transmission units (e.g., type 1 downlink transmission units) to determine an identity of a transmitting cell (e.g., associated with base station 202). For example, Beacon signals may be provided in a subset of the strip OFDM symbols (e.g., every eighth strip OFDM symbol) by employing beacon inserter 210, and from the time location of the Beacon signal the identity of the cell may be determined by cell identity evaluator 212. It is contemplated that a minimum of one Beacon signal may be used by cell identity evaluator 212 to obtain the identity of a cell; however, more than one Beacon signal may be employed for such evaluation.

Further, each cell may include one or more sectors. According to an illustration, the time location of the strip OFDM symbol and/or the Beacon carried by the strip OFDM symbol may be a function of the cell identifier; thus, different sectors of the same cell may utilize the same time location within the downlink transmission units. However, the disparate sectors may employ a different time location based upon a sector identifier, which is different for a different sector.

Beacon inserter 210 may selectively incorporate Beacon signals at respective time positions and/or subband positions. For example, a combination of the time position and subband position utilized to transmit a Beacon signal as set forth by beacon inserter 210 may be fixed (e.g., constant over time), and may correspond to a particular cell. Further to this example, system synchronization (e.g., timing and frequency) information may be uniquely derived from the time and frequency location of the Beacon signal (e.g., by employing cell identity evaluator 212). For instance, after mobile device 204 detects the Beacon signal, it can derive a physical layer identifier of a cell based upon the determined time position of the Beacon signal within the downlink transmission interval. Further, cell identity evaluator 212 may determine when the downlink transmission interval starts and ends, which may enhance synchronization.

Figure 3:
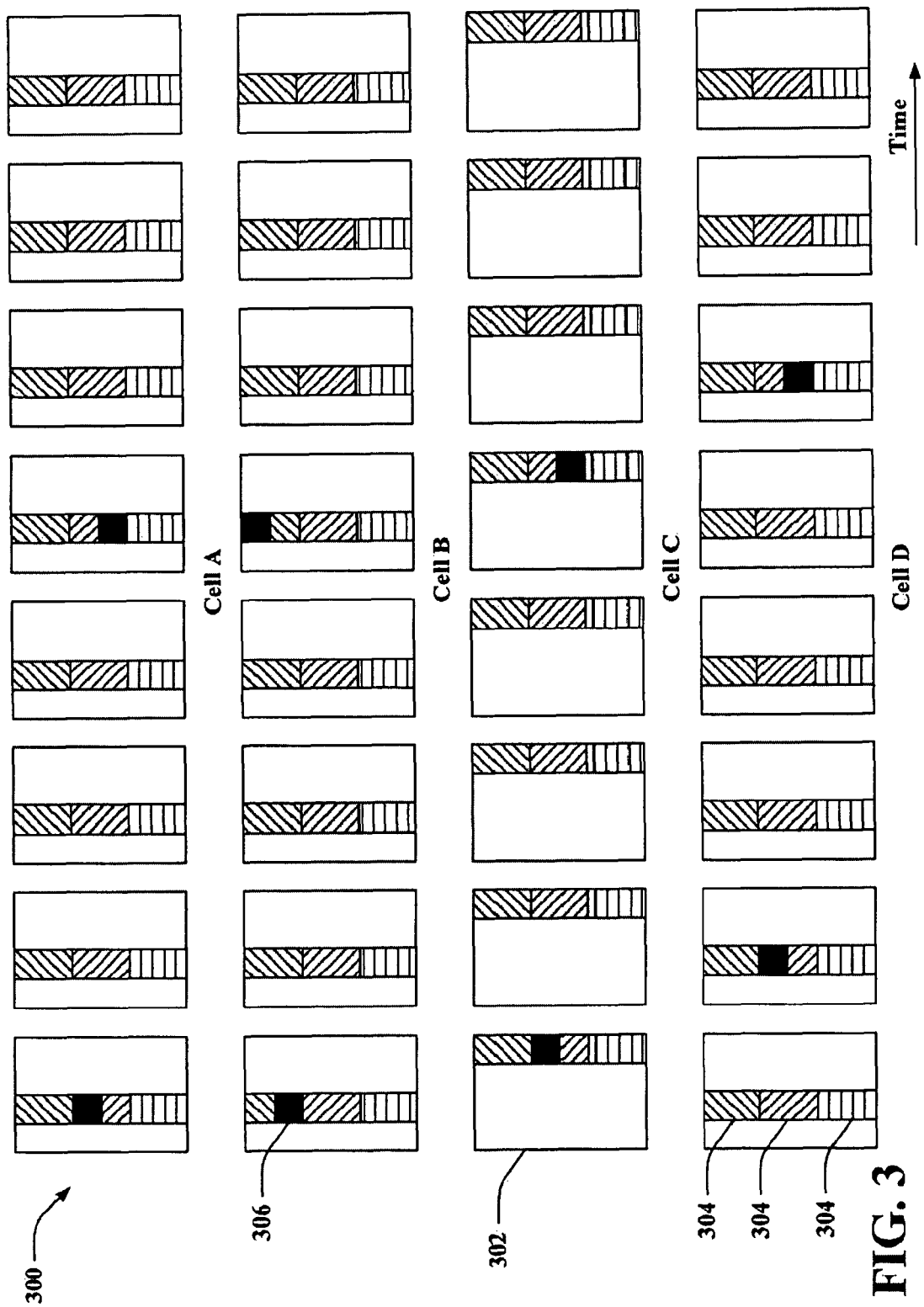
FIG. 3 is an illustration of an example representation depicting type 1 downlink transmission units that include Beacon signals for a plurality of cells.

With reference to FIG. 3, illustrated is an example representation 300 depicting type 1 downlink transmission units that include Beacon signals for a plurality of cells. It is to be appreciated that representation 300 is provided as an example and the claimed subject matter is not so limited. As shown, each big block (e.g., such as block 302, . . . ) represents a DL TU (e.g., type 1 downlink transmission unit), which includes several OFDM symbols (e.g., 4 OFDM symbols are included in representation 300). The tones are divided into 3 subbands (e.g., subbands 304, . . . ), and each of the subbands includes two tones. The small black block (e.g., block 306, . . . ) represents the Beacon signal. As illustrated, the Beacon occurs once every 4 DL TUs for each cell. Indeed, Beacons maintain the same distance in time, but also hop in frequency over time. In cell A, the Beacon is located in the middle subband in the second OFDM symbol of the DL TU. In cell B, the Beacon is located in the top subband in the second OFDM symbol of the DL TU. In cell C, the Beacon is located in the middle subband in the fourth OFDM symbol of the DL TU. In cell D, the Beacon is located in the top subband in the second OFDM symbol of the DL TU, which is different from the DL Beacon TU of cell A.

Figure 4:
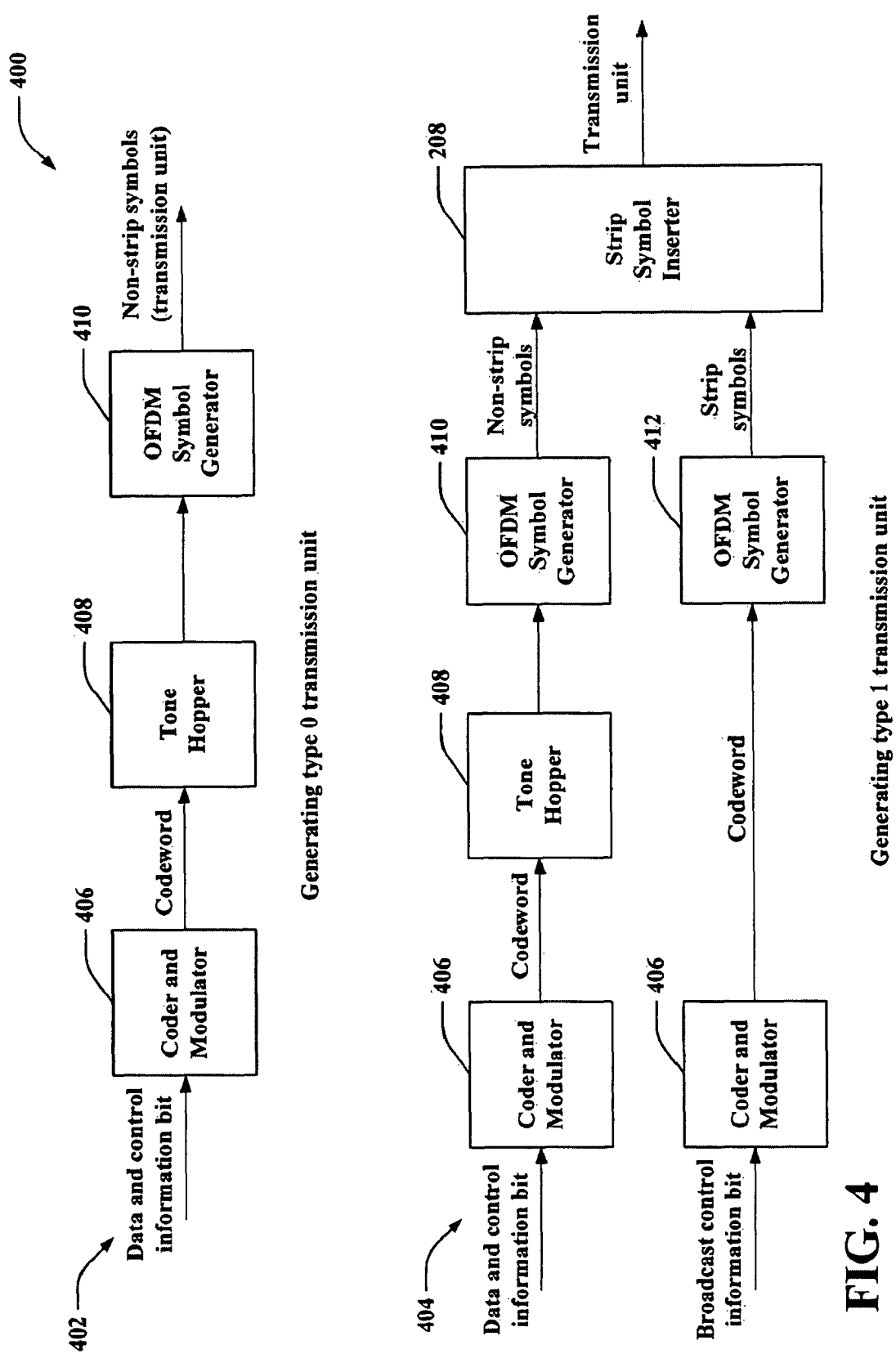
FIG. 4 is an illustration of an example system for generating type 0 and type 1 transmission units.

Turning to FIG. 4, illustrated is an example system 400 for generating type 0 and type 1 transmission units. System 400 can operate in a first mode 402 to generate type 0 transmission units and a second mode 404 to generate type 1 transmission units. According to an example, downlink transmission unit generator 206 of FIG. 2 can include system 400, and thus, can yield transmission units by leveraging system 400.

The following provides an example for operating in the first mode 402 to yield the type 0 transmission units. In particular, a data and control information bit can be coded and modulated by a coder and modulator 406 to yield a codeword. The codeword can thereafter be tone hopped by a tone hopper 408. Further, an OFDM symbol generator 410 can output the non-strip symbols that form the type 0 transmission unit.

By way of further illustration, type 1 transmission units can be generated while operating in the second mode 404. Accordingly, a data and control information bit can be coded and modulated by the coder and modulator 406. The codeword outputted by the coder and modulator 406 can be tone hopped by the tone hopper 408. Thereafter, the OFDM symbol generator 410 can yield the non-strip symbols. Moreover, a broadcast control information bit can be coded and modulated by the coder and modulator 406 to yield a corresponding codeword. This codeword can further be inputted to an OFDM symbol generator 412 that can yield strip symbols. The non-strip symbols and the strip symbols can be provided to a strip symbol inserter 208 (e.g., strip symbol inserter 208 of FIG. 2) to yield the type 1 transmission unit. Additionally, Beacon signals can be included in a subset of the type 1 transmission units generated by system 400 as described herein.

Figure 5:
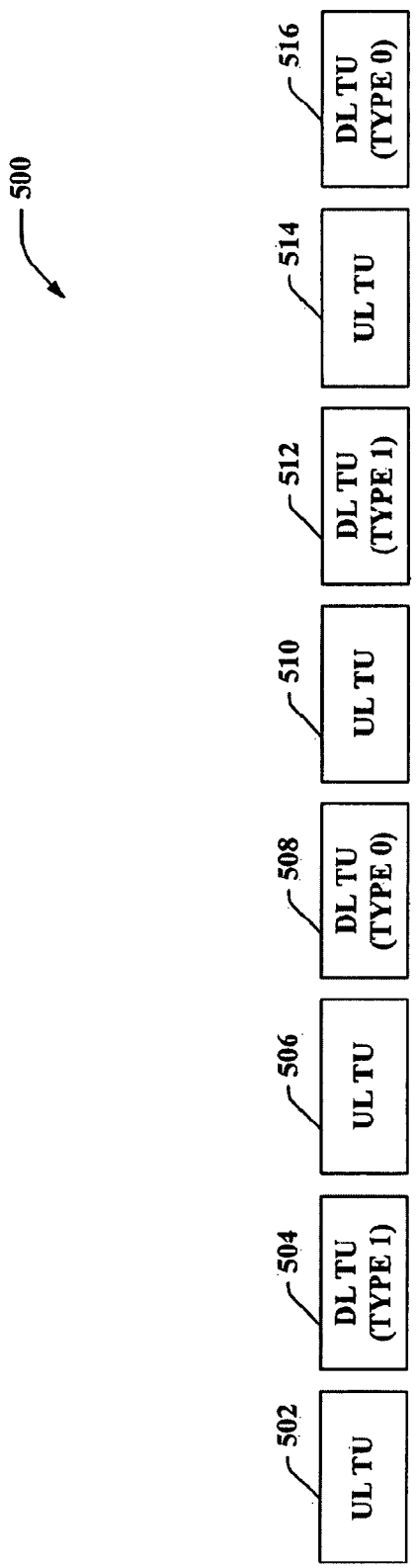
FIG. 5 is an illustration of an example superslot utilized within a wireless communication environment.

With reference to FIG. 5, illustrated is an example superslot 500 utilized within a wireless communication environment. Superslot 500 represents a time interval and may include any number of uplink transmission units (UL TUs) (e.g., transmitted from a mobile device to a base station) and any number of downlink transmission units (DL TUs) (e.g., transmitted from a base station to a mobile device). According to the illustrated example, superslot 500 may comprise four UL TUs 502, 506, 510, and 514 and four DL TUs 504, 508, 512, and 516. Further, differing types of DL TUs may be included within superslot 500; as depicted, superslot 500 comprises two type 1 DL TUs 504 and 512 (e.g., that include strip OFDM symbol(s)) and two type 0 DL TUs 508 and 516 (e.g., that need not include strip OFDM symbol(s)). Pursuant to an illustration, UL TUs 502, 506, 510, and 514 and type 0 DL TUs 508 and 516 may include 31 non-strip symbols, while type 1 DL TUs 504 and 512 may comprise 32 symbols (e.g., 31 non-strip symbols and another one strip symbol). Strip OFDM symbol(s) may be inserted in the type 1 DL TUs 504 and 512 at differing locations based upon a characteristic of a cell (e.g., cell identifier)—thus, cells may incorporate strip OFDM symbols at distinct positions as compared to disparate cells (e.g., disparate cells within a locale). Further, a subset of the OFDM symbols may include Beacon signals; the Beacon signals may be included at particular time locations as a function of a characteristic of a cell (e.g., cell identifier). Additionally, guard time intervals may be included between transmission units 502-516 of superslot 500. In a synchronized TDD system, the type 1 DL TUs occur in the same time for all the base stations, and the type 0 DL TUs occur in the same time for all the base stations.

Figure 6:
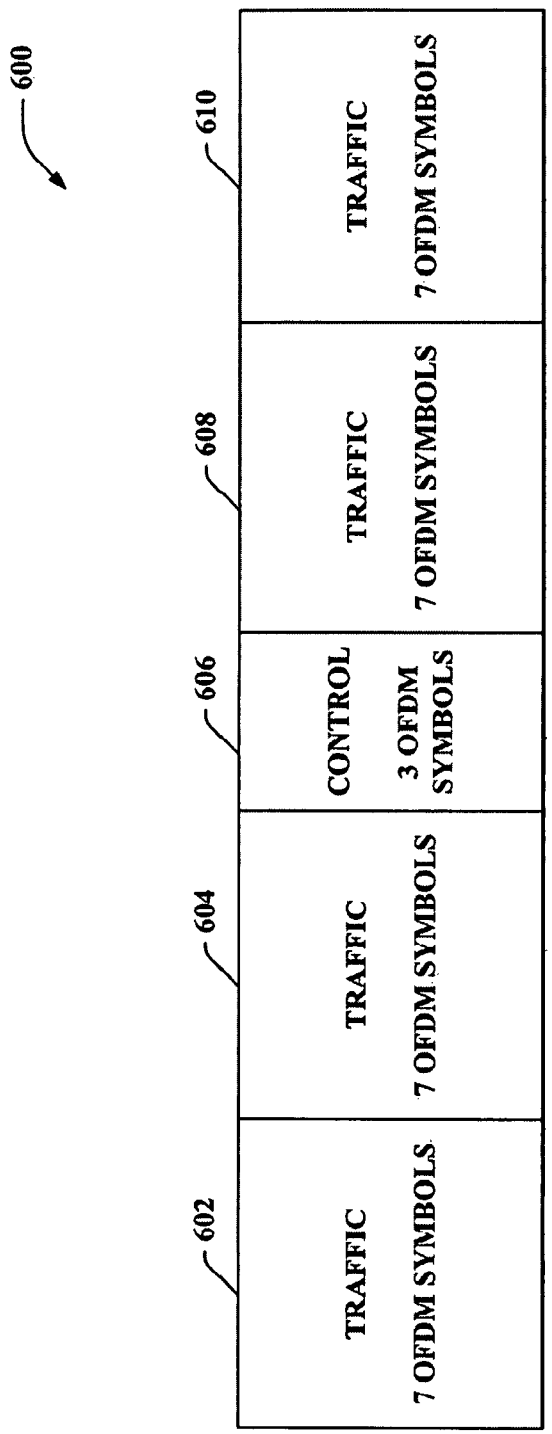
FIG. 6 is an illustration of an example type 0 downlink transmission unit (DL TU) employed in a wireless communication environment.

Turning to FIG. 6, illustrated is an example type 0 downlink transmission unit (DL TU) 600 employed in a wireless communication environment. Type 0 DL TU 600 may include 31 non-strip OFDM symbols, which may provide traffic and control data. The first 14 symbols of the type 0 DL TU 600 may be grouped into two half slots 602 and 604, and the last 14 symbols may also be grouped into another two half slots 608 and 610. Additionally, three OFDM symbols providing control data may be positioned at 606 between the first 14 symbols and the last 14 symbols. Each of the half slots 602, 604, 608, and 610 may include 7 OFDM symbols and may be utilized to provide traffic data. Further, hopping may occur at the boundary of the half slots 602, 604, 608, and 610. For instance, a hopping sequence may be defined for the non-strip OFDM symbols of type 0 DL TU 600. According to an example, a particular tone may be utilized for 7 OFDM symbols during half slot 602, and then a disparate tone may be employed for the 7 OFDM symbols of the next half slot 604, and so forth. That is, a block-based tone hopping scheme is used for the half slots 602, 604, 608, and 610. A different tone hopping scheme (e.g., symbol-by-symbol scheme) may be used in OFDM-symbols 606.

Figure 7:
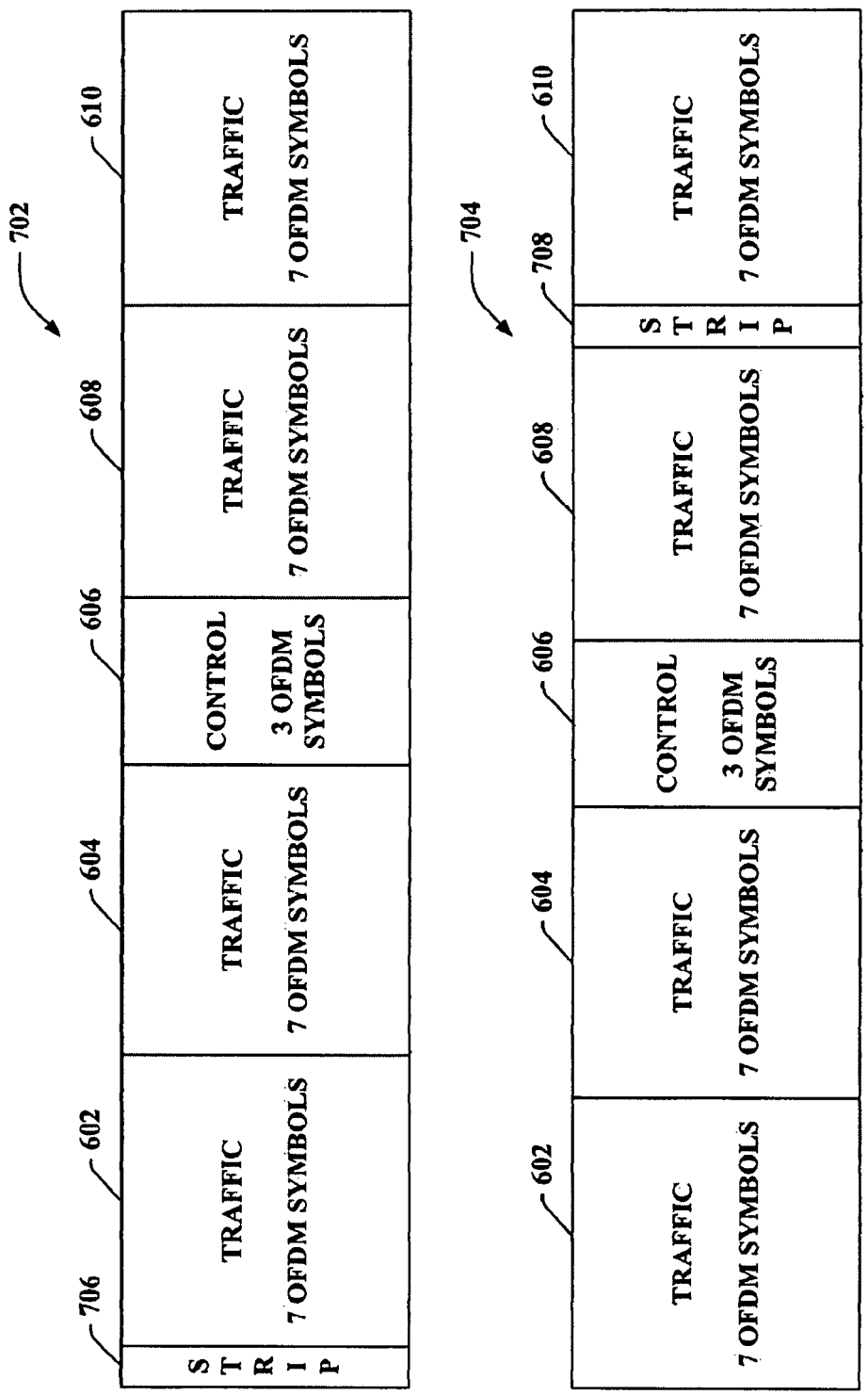
FIG. 7 is an illustration of example downlink transmission units (e.g., type 1 DL TUs) that include strip OFDM symbols positioned at hop boundaries for utilization in a wireless communication environment.

Now turning to FIG. 7, illustrated are example downlink transmission units 702 and 704 (e.g., type 1 DL TUs) that include strip OFDM symbols 706 and 708 positioned at hop boundaries for utilization in a wireless communication environment. It is to be appreciated that the claimed subject matter is not limited to the depicted locations for strip OFDM symbols 706 and 708. Further, a subset of the strip OFDM symbols may carry a Beacon signal. As noted above, strip OFDM symbols (and/or Beacon signals) may be positioned within DL TUs as a function of a characteristic of a cell (e.g., physical layer identifier of the cell). For instance, DL TU 702 may be utilized by a first base station associated with a first cell and DL TU 704 may be employed by a second base station related to a second cell. By varying the location of the strip OFDM symbol (and/or Beacon signal) for each cell (e.g., cells within close physical proximity), interference between strip OFDM symbols (and/or Beacon signals) of disparate cells may be mitigated, particularly for synchronized TDD wireless communication environments. Further, the position of the strip OFDM symbols (and/or Beacon signals carried by the strip OFDM symbols) may be utilized to identify cells.

According to an example, the channel structure of the remaining non-strip OFDM symbols of the type 1 DL TU can be the same as that of the type 0 DL TU. In particular, the tone hopping scheme can be the same. The coding and modulation scheme can also be the same. The strip OFDM symbol is generated from a codeword using a different coding/modulation scheme and separately from the generation of the non-strip OFDM symbols. In another example, to preserve block hopping as described in connection with the type 0 DL TU (e.g., type 0 DL TU 600 of FIG. 6), strip OFDM symbols (e.g., strip OFDM symbols 706 and 708) may possibly be positioned before or after each half slot 602, 604, 608 and 610, or before or after each of the remaining three non-strip OFDM symbols utilized to provide control data at 606. Thus, following this example, type 1 DL TUs may include eight potential positions for the strip OFDM symbols, two of which are shown in DL TUs 702 and 704. Additionally or alternatively, strip OFDM symbol(s) may be included between half slot 602 and half slot 604, before the first control related symbol, between the first and second control related symbol, between the second and third control related symbol, after the third control related symbol, and after half slot 610. By employing the foregoing example, the seven symbols of each half slot 602, 604, 608, and 610 may remain together while the strip OFDM symbols may be inserted at hop boundaries.

Figure 8:
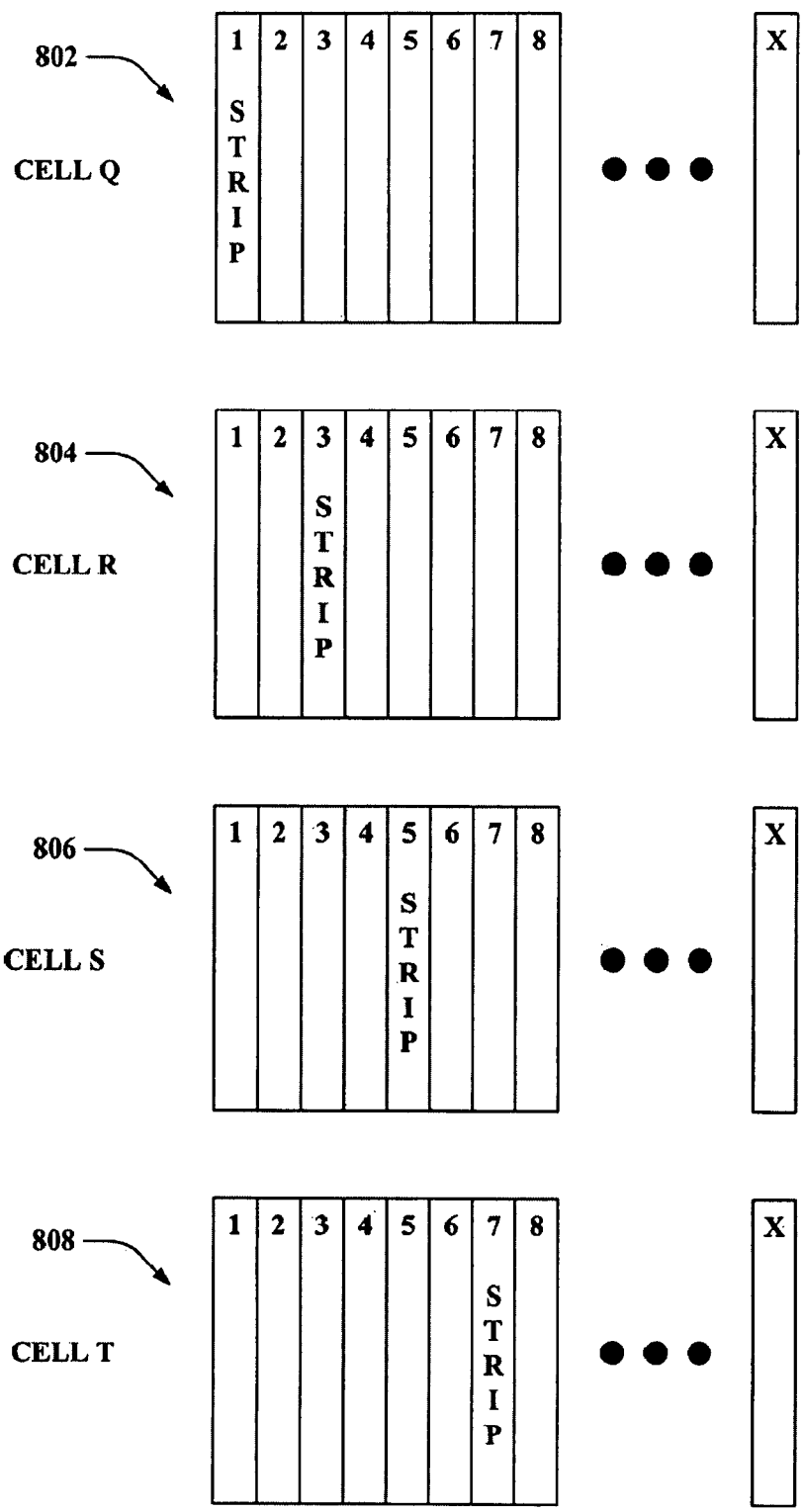
FIG. 8 is an illustration of example type 1 downlink transmission units with strip OFDM symbols selectively positioned based upon considerations of drift.

With reference to FIG. 8, illustrated are example type 1 downlink transmission units with strip OFDM symbols selectively positioned based upon considerations of timing drift (e.g., difference in the propagation delays from different base stations to a given mobile terminal). In accordance with various aspects, the type 1 downlink transmission units may include X symbols, where X may be any integer (e.g., X may be 32). For example, one of the X symbols may be a strip OFDM symbol (e.g., that may carry a Beacon signal), while the remainder of the X symbols may be non-strip OFDM symbols. The strip OFDM symbol (and/or a Beacon signal carried by the strip OFDM symbol), further, may be selectively positioned based upon an identifier associated with a cell (e.g., physical layer identifier of the cell). For instance, cell Q, cell R, cell S, and cell T may be disparate cells that yield type 1 downlink transmission units 802, 804, 806, and 808, respectively; further, each of these cells may multiplex the strip OFDM symbol at corresponding unique locations within the type 1 downlink transmission units. Thus, the strip OFDM symbol may be the first symbol included in a downlink transmission unit for a first cell (e.g., cell Q), a third symbol for a differing cell (e.g., cell R), and so forth. Pursuant to the depicted example, cells may position the strip OFDM symbols with a separation of one symbol (e.g., one cell may insert a strip OFDM symbol as the first symbol, no cell may insert a strip OFDM symbol as the second symbol, a disparate cell may insert a strip OFDM symbol as the third symbol, . . . ); however, it is to be appreciated that any size separation may be utilized in connection with the claimed subject matter. Further, a subset of the strip OFDM symbols may carry a Beacon signal, the time location of which may be unique (e.g., locally) to a cell.

According to an example, propagation differences may cause a mobile device to receive symbols of downlink transmission units transferred simultaneously from differing base stations at slightly disparate times, which yields drift. For instance, propagation differences may be a function of cell size, distance from each base station to the mobile device, and the like. Accordingly, a symbol transferred from a first cell during a first synchronized time may interfere with a symbol transmitted from a second cell during a second synchronized time. Further, the separation between strip OFDM symbols of differing cells may be based upon the expected drift; thus, if the drift is half a symbol, then a separation of one symbol may be employed, while if the drift is one symbol, then a separation of two symbols may be utilized, for example.

Referring to FIGS. 9-12, methodologies relating to selectively positioning Beacon signals in downlink transmission units for utilization in wireless communication environments are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Figure 9:
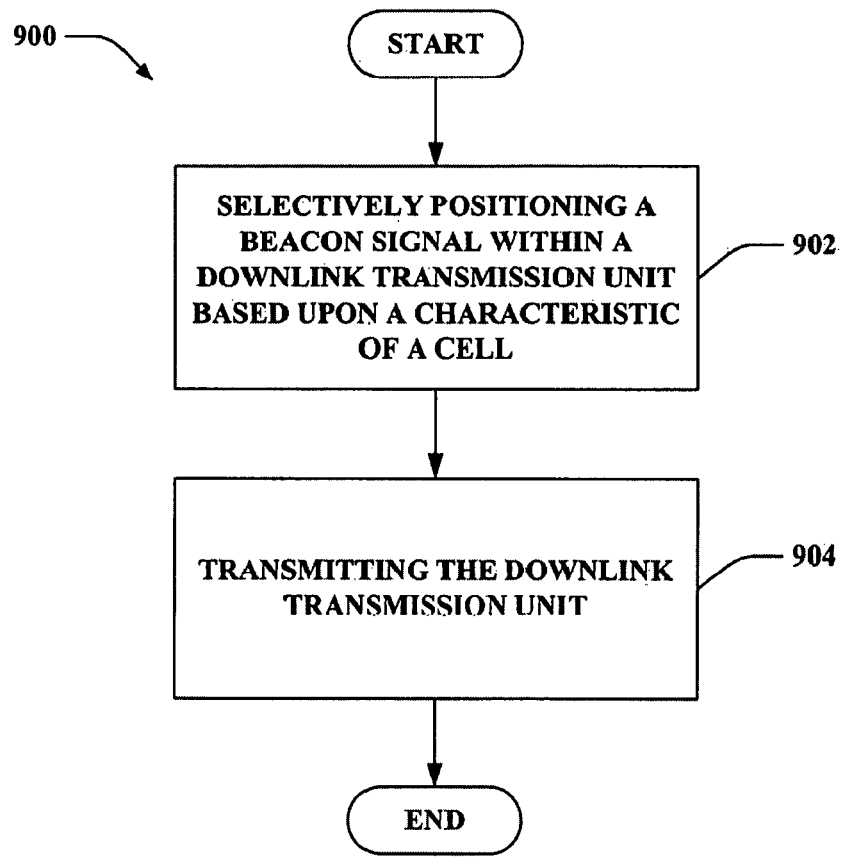
FIG. 9 is an illustration of an example methodology that facilitates mitigating interference between Beacon signals within an OFDM TDD environment.

With reference to FIG. 9, illustrated is a methodology 900 that facilitates mitigating interference between Beacon signals within an OFDM TDD environment. At 902, a Beacon signal may be selectively positioned within a downlink transmission unit based upon a characteristic of a cell. For instance, the characteristic may be a cell identifier. The Beacon signal may be selectively positioned to mitigate alignment with a disparate Beacon signal in a differing downlink transmission unit generated for transfer by a different cell. For instance, Beacon signals may be included in a subset of strip OFDM symbols of downlink transmission units generated for transmission over a downlink. According to an example, a strip OFDM symbol may be included at a location adjacent to a half slot boundary or a non-strip, control OFDM symbol in the downlink transmission unit. Moreover, according to an illustration, the downlink transmission unit may include 31 non-strip OFDM symbols and one strip OFDM symbol. In accordance with another example, the position of the strip OFDM symbol may vary as a function of time (e.g., from one transmission unit to another). By way of another example, the strip OFDM symbol may be selectively interposed in the downlink transmission unit as a function of expected drift (e.g., associated with propagation differences that yield shifts in time associated with receipt at a mobile device of downlink transmission units concurrently transmitted from disparate cells). Thus, the downlink transmission unit may include a selectively positioned strip OFDM symbol, and a subset of the strip OFDM symbols may be utilized to carry Beacon signals.

At 904, the downlink transmission unit may be transmitted. For example, the downlink transmission unit may be sent over a downlink during allocated time(s) within a superslot. Further, uplink transmission unit(s) and downlink transmission unit(s) lacking a strip OFDM symbol (e.g., that include 31 non-strip OFDM symbols) may be transmitted during disparate times within the superslot.

Figure 10:
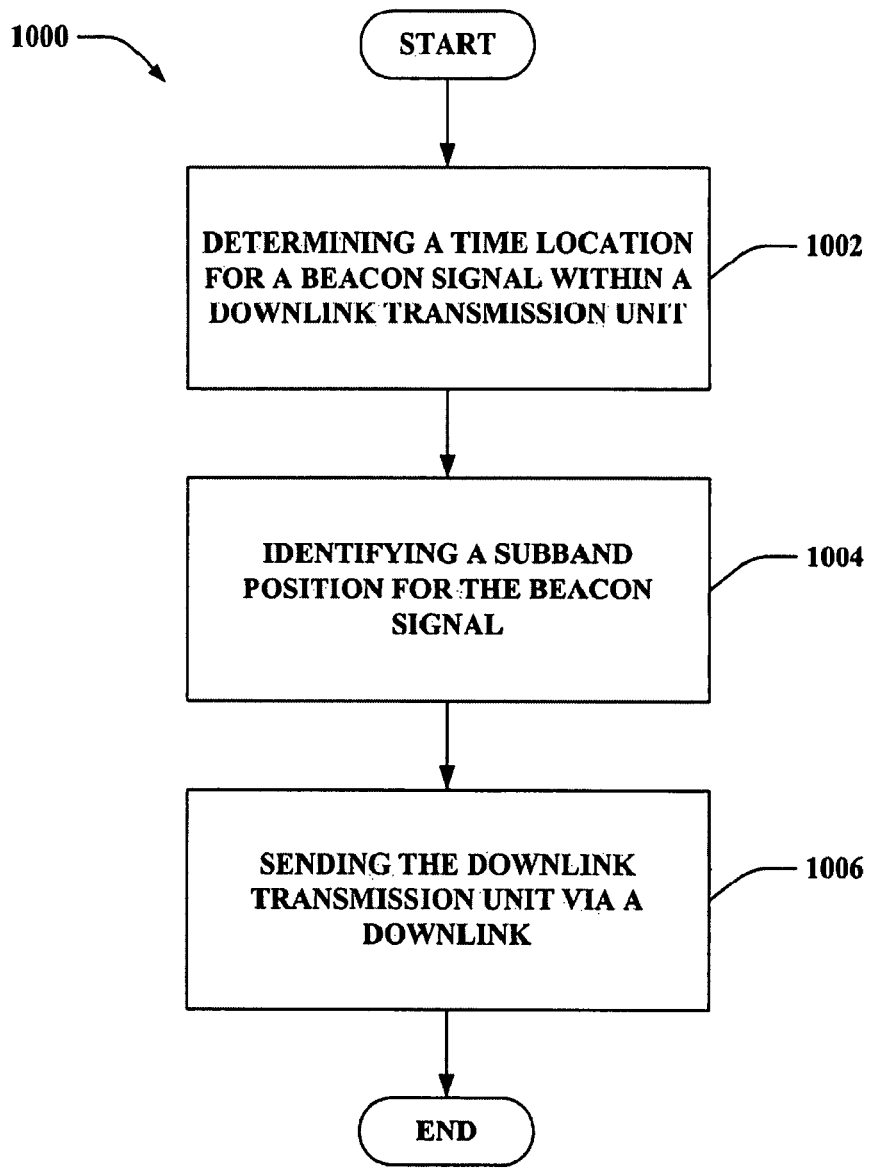
FIG. 10 is an illustration of an example methodology that facilitates generating downlink transmission units with selectively incorporated Beacon signals within an OFDM TDD environment.

Now turning to FIG. 10, illustrated is a methodology 1000 that facilitates generating downlink transmission units with selectively incorporated Beacon signals within an OFDM TDD environment. At 1002, a time location for a Beacon signal within a downlink transmission unit may be determined. For example, the time location may be selected based upon a characteristic of a cell (e.g., cell identifier), an expected drift, and so forth. Further, the time location may be determined to mitigate alignment with a disparate Beacon signal associated with a differing cell. According to an example, the time position may correspond to a subset of downlink transmission units associated with a cell. Thus, pursuant to an example, one downlink transmission unit (e.g., type 1 downlink transmission unit) may include the Beacon signal, while seven downlink transmission units (e.g., type 1 downlink transmission units) may lack the Beacon signal (e.g., yet may include strip OFDM symbols); however, the claimed subject matter is not limited to the aforementioned example. At 1004, a subband position for the Beacon signal may be identified. For example, the subband position may be determined based upon a characteristic of the cell (e.g., cell identifier) and/or to mitigate interference with a disparate Beacon signal associated with a differing cell. At 1006, the downlink transmission unit may be sent via a downlink.

Figure 11:
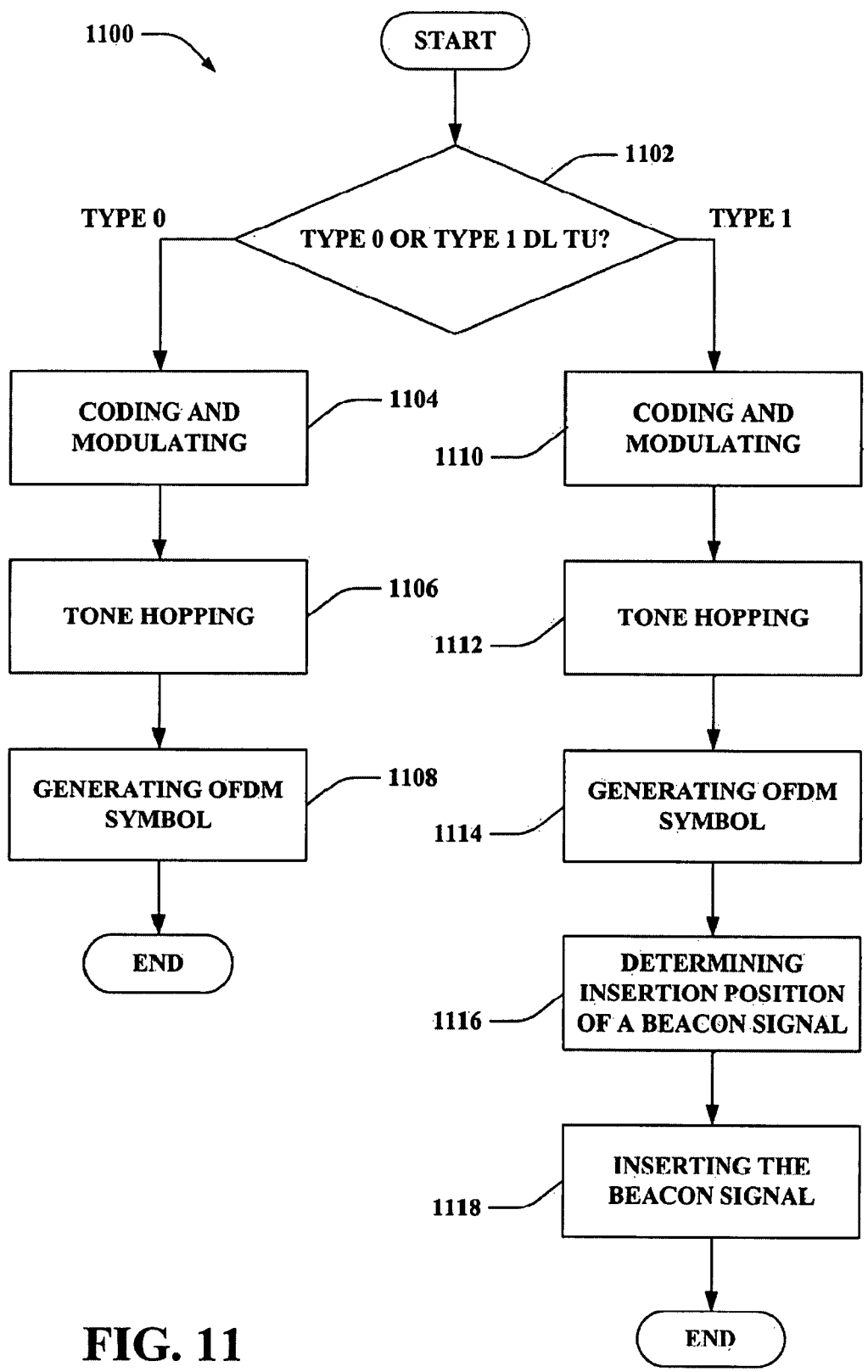
FIG. 11 is an illustration of an example methodology that facilitates generating type 0 and type 1 downlink transmission units.

Turning to FIG. 11, illustrated is a methodology 1100 that facilitates generating type 0 and type 1 downlink transmission units. At 1102, a determination may be effectuated as to whether a type 0 or a type 1 downlink transmission unit is to be generated. By way of example, such a determination may be made based upon a schedule (e.g., a particular time within a superslot, . . . ). If a type 0 downlink transmission unit is to be yielded, the methodology 1100 continues to 1104. At 1104, data and control information bit(s) may be coded and modulated. At 1106, a resulting codeword may be tone hopped. At 1108, OFDM symbol(s) may be generated that may form the type 0 downlink transmission unit. For instance, a plurality of non-strip symbols may be yielded for the type 0 downlink transmission unit. If it is determined at 1102 that a type 1 downlink transmission unit is to be generated, then the methodology 1100 continues to 1110. Although not shown, it is to be appreciated that a determination can be effectuated concerning whether to include a Beacon signal in the type 1 downlink transmission unit. At 1110, data and control information bit(s) may be coded and modulated. Further, broadcast control information bit(s) may be coded and modulated. At 1112, a codeword corresponding to the data and control information bit(s) may be tone hopped (e.g., a codeword related to the broadcast control information bit need not be tone hopped). At 1114, OFDM symbol(s) (e.g., non-strip symbol(s), strip symbol(s)) may be generated. At 1116, an insertion position of a Beacon signal in the type 1 downlink transmission unit may be determined (e.g., based upon a cell identifier, expected drift, . . . ). At 1118, the Beacon signal may be inserted within the type 1 downlink transmission unit.

Figure 12:
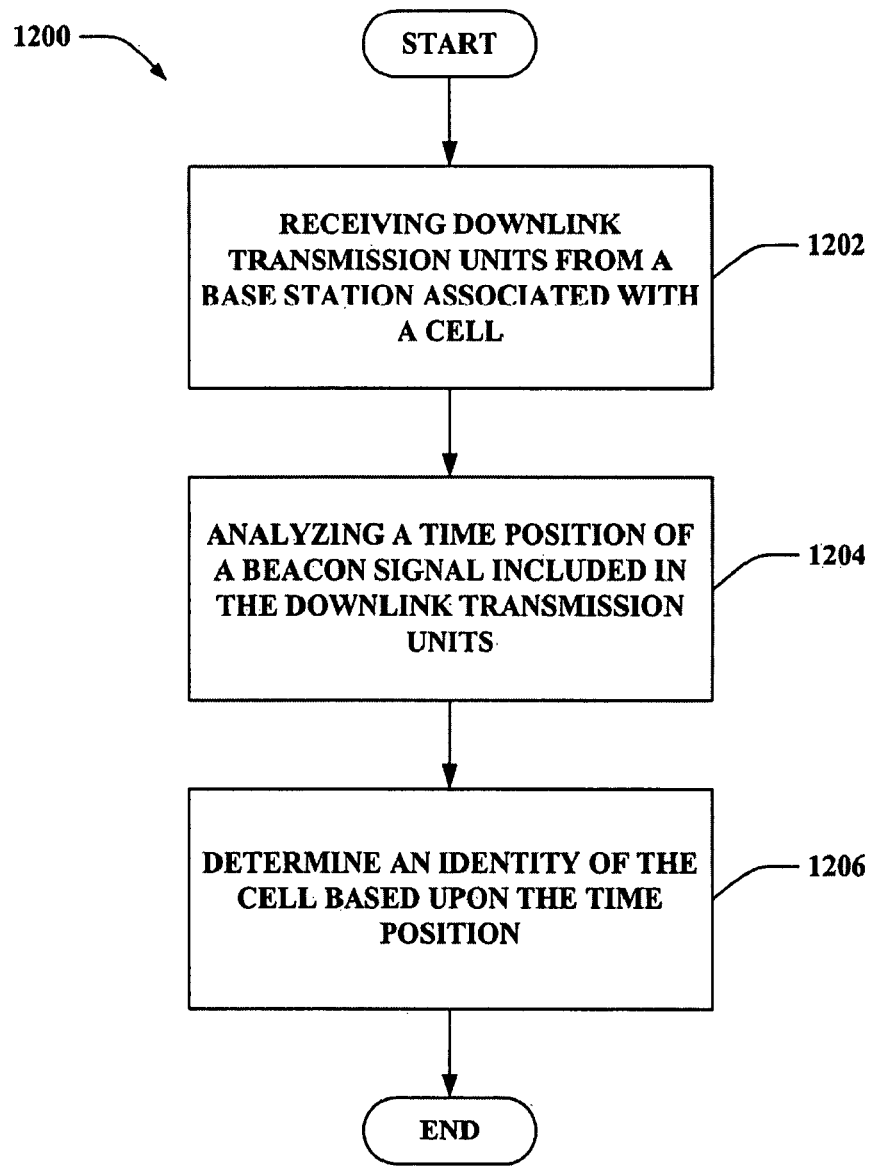
FIG. 12 is an illustration of an example methodology that facilitates analyzing downlink transmission units with selectively spaced Beacon signals in an OFDM TDD environment.

Referring now to FIG. 12, illustrated is a methodology 1200 that facilitates analyzing downlink transmission units with selectively spaced Beacon signals in an OFDM TDD environment. At 1202, downlink transmission units may be received from a base station associated with a cell. For example, the downlink transmission units may be type 1 downlink transmission units that each may include M strip OFDM symbols and N non-strip OFDM symbols, where M and N may be any integers. Pursuant to an example, the type 1 downlink transmission unit may include 1 strip OFDM symbol and 31 non-strip OFDM symbols; however, the claimed subject matter is not so limited. Further, a subset of the strip OFDM symbols in the downlink transmission units may carry a Beacon signal (e.g., 1 out of 8 OFDM symbols may include the Beacon signal, . . . ). At 1204, a time position of the Beacon signal included in the downlink transmission unit may be analyzed. For example, a portion of the downlink transmission units may include Beacon signals. According to a further example, a beginning and an end of a downlink transmission interval may be identified. Pursuant to this example, inclusion of a Beacon signal and, if the Beacon signal is incorporated into the downlink transmission unit, the location of the Beacon signal within the downlink transmission interval may be determined. At 1206, an identity of the cell may be determined based upon the time position. For example, 72 disparate time locations may be employed, and each of the disparate time locations may correlate to a differing cell; however, the claimed subject matter is not so limited as it is contemplated that any number of different time locations may be employed. Further, the time location may uniquely correspond (e.g., within a geographic region) to a particular cell.

According to an example, a wireless terminal may receive a downlink signal (e.g., downlink transmission unit). The Beacon signal may be decoded to recover a cell ID, sector ID, etc., from which the wireless terminal determinations the position of the Beacon signal in the downlink signal. Accordingly, a framing structure of the downlink signal of the intended base station associated with the downlink signal may be recognized. For instance, a starting point of DL TUs, scheduling for different types of DL TUs, etc. may be determined as a function of the framing structure. The wireless terminal may store the framing structure in memory and use it to retrieve other control/data information from the downlink signal. The wireless terminal may further determine the framing structure of the uplink signal, and transmit a signal (e.g., an access signal) according to the uplink framing structure.

It will be appreciated that, in accordance with one or more aspects described herein, inferences can be made regarding generating downlink transmission units and/or identifying sources of received downlink transmission units. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to electing a location to insert strip OFDM symbols and/or Beacon signals within downlink transmission units. In accordance with another example, an inference may be made related to identifying an expected drift, which may be utilized in connection with selectively position strip OFDM symbols and/or Beacon signals in downlink transmission units. By way of further illustration, an inference may be made related to determining an identity of a cell that generated and/or transmitted a received downlink transmission unit. It will be appreciated that the foregoing examples are illustrative in nature and are not intended to limit the number of inferences that can be made or the manner in which such inferences are made in conjunction with the various embodiments and/or methods described herein.

Figure 13:
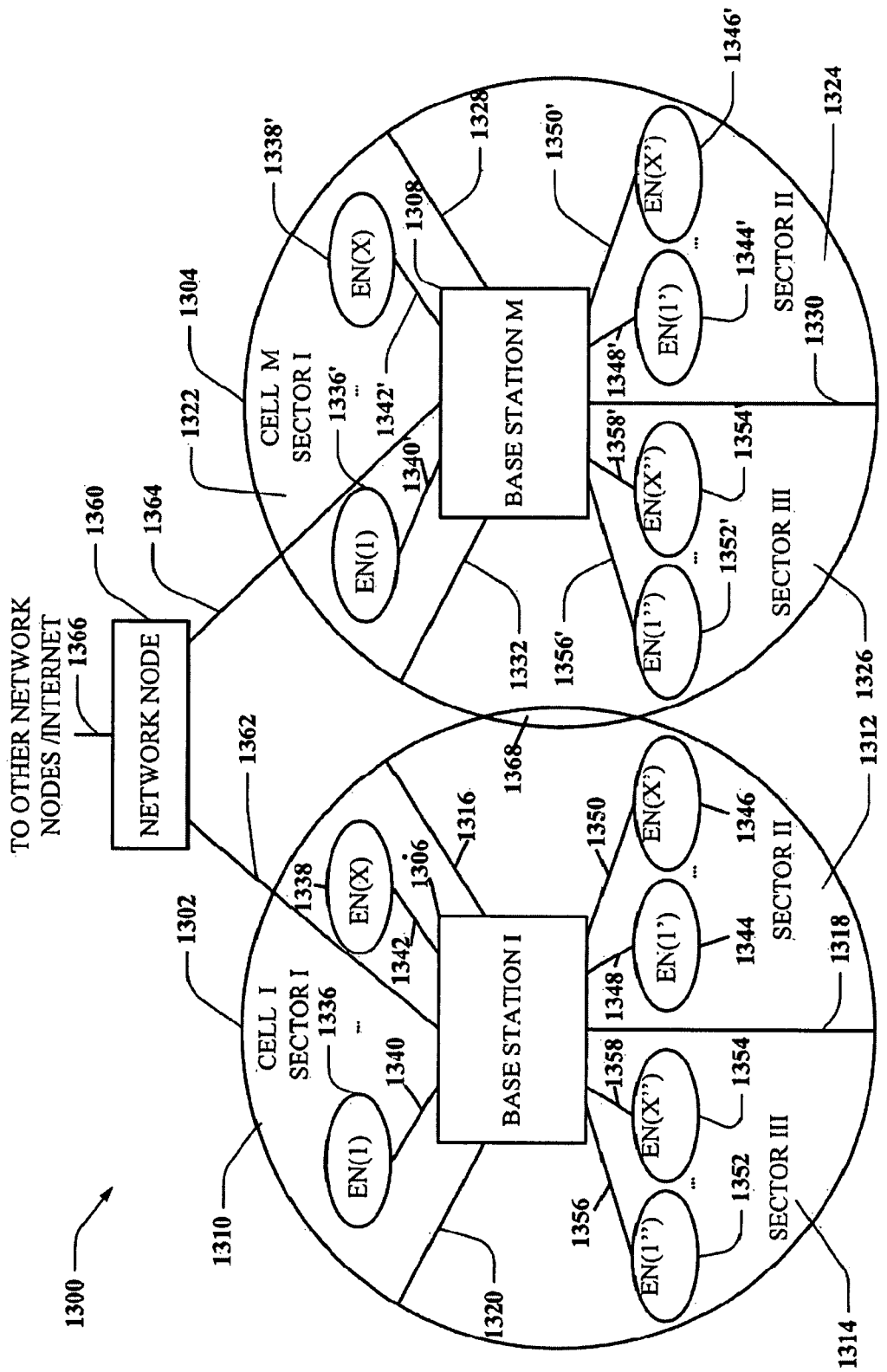
FIG. 13 is an illustration of an example communication system implemented in accordance with various aspects including multiple cells.

FIG. 13 depicts an example communication system 1300 implemented in accordance with various aspects including multiple cells: cell I 1302, cell M 1304. Note that neighboring cells 1302, 1304 overlap slightly, as indicated by cell boundary region 1368, thereby creating potential for signal interference between signals transmitted by base stations in neighboring cells. Each cell 1302, 1304 of system 1300 includes three sectors. Cells which have not be subdivided into multiple sectors (N=1), cells with two sectors (N=2) and cells with more than 3 sectors (N>3) are also possible in accordance with various aspects. Cell 1302 includes a first sector, sector I 1310, a second sector, sector II 1312, and a third sector, sector III 1314. Each sector 1310, 1312, 1314 has two sector boundary regions; each boundary region is shared between two adjacent sectors.

Sector boundary regions provide potential for signal interference between signals transmitted by base stations in neighboring sectors. Line 1316 represents a sector boundary region between sector I 1310 and sector II 1312; line 1318 represents a sector boundary region between sector II 1312 and sector III 1314; line 1320 represents a sector boundary region between sector III 1314 and sector I 1310. Similarly, cell M 1304 includes a first sector, sector I 1322, a second sector, sector II 1324, and a third sector, sector III 1326. Line 1328 represents a sector boundary region between sector I 1322 and sector II 1324; line 1330 represents a sector boundary region between sector II 1324 and sector III 1326; line 1332 represents a boundary region between sector III 1326 and sector 11322. Cell I 1302 includes a base station (BS), base station I 1306, and a plurality of end nodes (ENs) (e.g., mobile devices) in each sector 1310, 1312, 1314. Sector I 1310 includes EN(1) 1336 and EN(X) 1338 coupled to BS 1306 via wireless links 1340, 1342, respectively; sector II 1312 includes EN(1') 1344 and EN(X') 1346 coupled to BS 1306 via wireless links 1348, 1350, respectively; sector III 1314 includes EN(1") 1352 and EN(X") 1354 coupled to BS 1306 via wireless links 1356, 1358, respectively. Similarly, cell M 1304 includes base station M 1308, and a plurality of end nodes (ENs) in each sector 1322, 1324, 1326. Sector I 1322 includes EN(1) 1336' and EN(X) 1338' coupled to BS M 1308 via wireless links 1340', 1342', respectively; sector II 1324 includes EN(1') 1344' and EN(X') 1346' coupled to BS M 1308 via wireless links 1348', 1350', respectively; sector 3 1326 includes EN(1") 1352' and EN(X") 1354' coupled to BS 1308 via wireless links 1356', 1358', respectively.

System 1300 also includes a network node 1360 which is coupled to BS I 1306 and BS M 1308 via network links 1362, 1364, respectively. Network node 1360 is also coupled to other network nodes, e.g., other base stations, AAA server nodes, intermediate nodes, routers, etc. and the Internet via network link 1366. Network links 1362, 1364, 1366 may be, e.g., fiber optic cables. Each end node, e.g., EN(1) 1336 may be a wireless terminal including a transmitter as well as a receiver. The wireless terminals, e.g., EN(1) 1336 may move through system 1300 and may communicate via wireless links with the base station in the cell in which the EN is currently located. The wireless terminals, (WTs), e.g., EN(1) 1336, may communicate with peer nodes, e.g., other WTs in system 1300 or outside system 1300 via a base station, e.g., BS 1306, and/or network node 1360. WTs, e.g., EN(1) 1336 may be mobile communications devices such as cell phones, personal data assistants with wireless modems, etc. Respective base stations perform tone subset allocation using a different method for the strip-symbol periods, from the method employed for allocating tones and determining tone hopping in the rest symbol periods, e.g., non strip-symbol periods. The wireless terminals use the tone subset allocation method along with information received from the base station, e.g., base station slope ID, sector ID information, to determine tones that they can employ to receive data and information at specific strip-symbol periods. The tone subset allocation sequence is constructed, in accordance with various aspects to spread inter-sector and inter-cell interference across respective tones.

Figure 14:
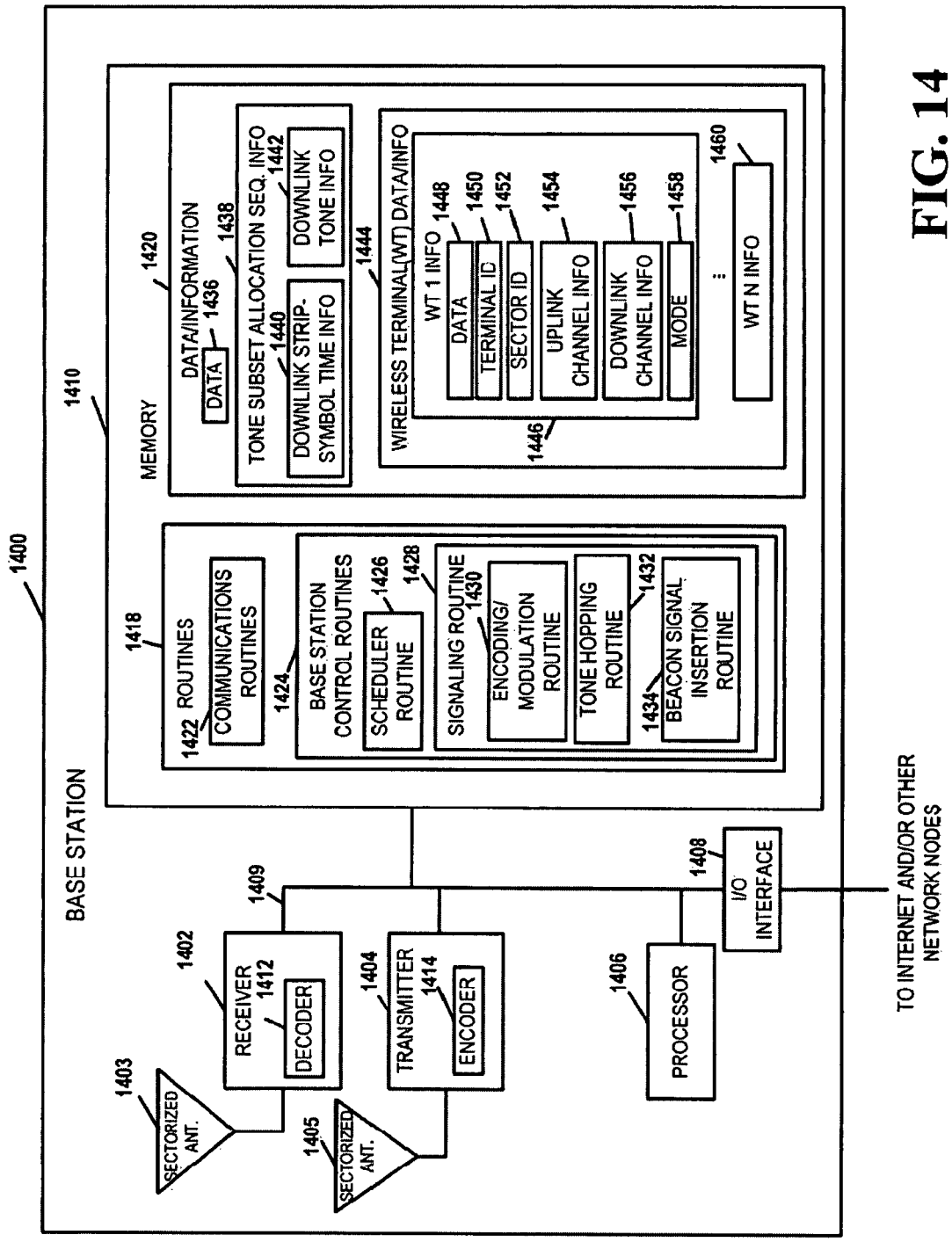
FIG. 14 is an illustration of an example base station in accordance with various aspects.

FIG. 14 illustrates an example base station 1400 in accordance with various aspects. Base station 1400 implements tone subset allocation sequences, with different tone subset allocation sequences generated for respective different sector types of the cell. Base station 1400 may be used as any one of base stations 1306, 1308 of the system 1300 of FIG. 13. The base station 1400 includes a receiver 1402, a transmitter 1404, a processor 1406, e.g., CPU, an input/output interface

1408 and memory 1410 coupled together by a bus 1409 over which various elements 1402, 1404, 1406, 1408, and 1410 may interchange data and information.

Sectorized antenna 1403 coupled to receiver 1402 is used for receiving data and other signals, e.g., channel reports, from wireless terminals transmissions from each sector within the base station's cell. Sectorized antenna 1405 coupled to transmitter 1404 is used for transmitting data and other signals, e.g., control signals, pilot signal, beacon signals, etc. to wireless terminals 1500 (see FIG. 15) within each sector of the base station's cell. In various aspects, base station 1400 may employ multiple receivers 1402 and multiple transmitters 1404, e.g., an individual receiver 1402 for each sector and an individual transmitter 1404 for each sector. Processor 1406, may be, e.g., a general purpose central processing unit (CPU). Processor 1406 controls operation of base station 1400 under direction of one or more routines 1418 stored in memory 1410 and implements the methods. I/O interface 1408 provides a connection to other network nodes, coupling the BS 1400 to other base stations, access routers, AAA server nodes, etc., other networks, and the Internet. Memory 1410 includes routines 1418 and data/information 1420.

Data/information 1420 includes data 1436, tone subset allocation sequence information 1438 including downlink strip-symbol time information 1440 and downlink tone information 1442, and wireless terminal (WT) data/info 1444 including a plurality of sets of WT information: WT 1 info 1446 and WT N info 1460. Each set of WT info, e.g., WT 1 info 1446 includes data 1448, terminal ID 1450, sector ID 1452, uplink channel information 1454, downlink channel information 1456, and mode information 1458.

Routines 1418 include communications routines 1422 and base station control routines 1424. Base station control routines 1424 includes a scheduler routine 1426 and signaling routines 1428 including an encoding/modulation routine 1430, a tone hopping routine 1432, and a Beacon signal insertion routine 1434. Scheduler routine 1426 controls determining a type of downlink transmission unit to transmit (e.g., type 0, type 1, . . . ) and/or whether to include a Beacon signal in a particular type 1 downlink transmission unit.

Data 1436 includes data to be transmitted that will be sent to encoder 1414 of transmitter 1404 for encoding prior to transmission to WTs, and received data from WTs that has been processed through decoder 1412 of receiver 1402 following reception. Downlink strip-symbol time information 1440 includes the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone information 1442 includes information including a carrier frequency assigned to the base station 1400, the number and frequency of tones, and the set of tone subsets to be allocated to the strip-symbol periods, and other cell and sector specific values such as slope, slope index and sector type.

Data 1448 may include data that WT1 1500 has received from a peer node, data that WT1 1500 desires to be transmitted to a peer node, and downlink channel quality report feedback information. Terminal ID 1450 is a base station 1400 assigned ID that identifies WT1 1500. Sector ID 1452 includes information identifying the sector in which WT1 1500 is operating. Sector ID 1452 can be used, for example, to determine the sector type. Uplink channel information 1454 includes information identifying channel segments that have been allocated by scheduler 1426 for WT1 1500 to use, e.g., uplink traffic channel segments for data, dedicated uplink control channels for requests, power control, timing control, etc. Each uplink channel assigned to WT1 1500 includes one or more logical tones, each logical tone following an uplink hopping sequence. Downlink channel information 1456 includes information identifying channel segments that have been allocated by scheduler 1426 to carry data and/or information to WT1 1500, e.g., downlink traffic channel segments for user data. Each downlink channel assigned to WT1 1500 includes one or more logical tones, each following a downlink hopping sequence. Mode information 1458 includes information identifying the state of operation of WT1 1500, e.g. sleep, hold, on.

Communications routines 1422 control the base station 1400 to perform various communications operations and implement various communications protocols. Base station control routines 1424 are used to control the base station 1400 to perform basic base station functional tasks, e.g., signal generation and reception, scheduling, and to implement the steps of the method of some aspects including transmitting signals to wireless terminals using the tone subset allocation sequences during the strip-symbol periods.

Signaling routine 1428 controls the operation of receiver 1402 with its decoder 1412 and transmitter 1404 with its encoder 1414. The signaling routine 1428 is responsible for controlling the generation of transmitted data 1436 and control information. Encoding/modulation routine 1430 controls coding and modulation for non-strip symbols and strip symbols. Further, tone hopping routine 1432 controls tone hopping in connection with non-strip symbols. Moreover, Beacon signal insertion routine 1434 controls selectively positioning a Beacon signal within a type 1 downlink transmission unit.

Figure 15:
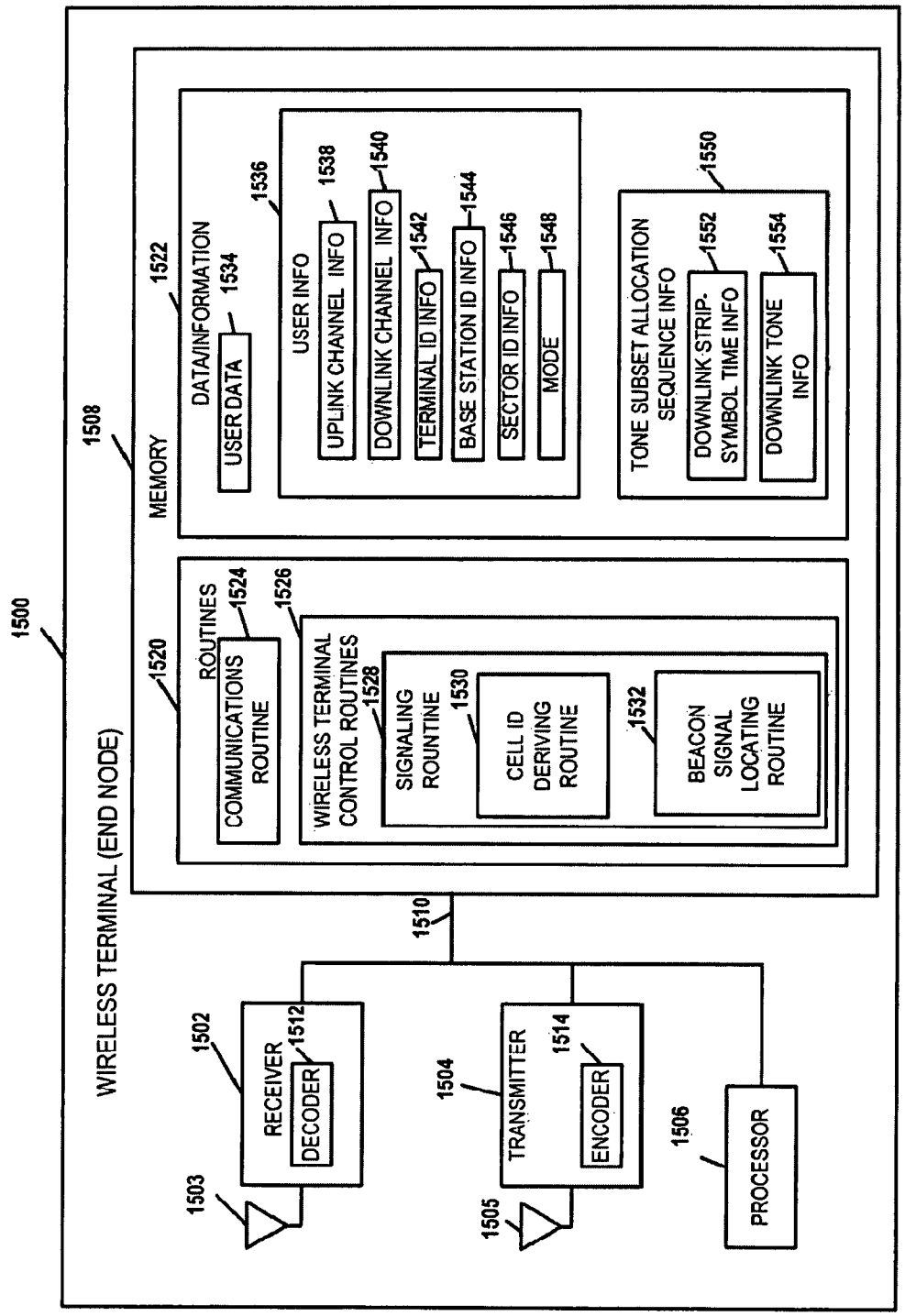
FIG. 15 is an illustration of an example wireless terminal (e.g., mobile device, end node, . . . ) implemented in accordance with various aspects described herein.

FIG. 15 illustrates an example wireless terminal (e.g., end node, mobile device, . . . ) 1500 which can be used as any one of the wireless terminals (e.g., end nodes, mobile devices, . . . ), e.g., EN(1) 1336, of the system 1300 shown in FIG. 13. Wireless terminal 1500 implements the tone subset allocation sequences. The wireless terminal 1500 includes a receiver 1502 including a decoder 1512, a transmitter 1504 including an encoder 1514, a processor 1506, and memory 1508 which are coupled together by a bus 1510 over which the various elements 1502, 1504, 1506, 1508 can interchange data and information. An antenna 1503 used for receiving signals from a base station 1400 is coupled to receiver 1502. An antenna 1505 used for transmitting signals, e.g., to base station 1400 is coupled to transmitter 1504.

The processor 1506, e.g., a CPU controls the operation of the wireless terminal 1500 and implements methods by executing routines 1520 and using data/information 1522 in memory 1508.

Data/information 1522 includes user data 1534, user information 1536, and tone subset allocation sequence information 1550. User data 1534 may include data, intended for a peer node, which will be routed to encoder 1514 for encoding prior to transmission by transmitter 1504 to base station 1400, and data received from the base station 1400 which has been processed by the decoder 1512 in receiver 1502. User information 1536 includes uplink channel information 1538, downlink channel information 1540, terminal ID information 1542, base station ID information 1544, sector ID information 1546, and mode information 1548. Uplink channel information 1538 includes information identifying uplink channels segments that have been assigned by base station 1400 for wireless terminal 1500 to use when transmitting to the base station 1400. Uplink channels may include uplink traffic channels, dedicated uplink control channels, e.g., request channels, power control channels and timing control channels. Each uplink channel includes one or more logic tones, each logical tone following an uplink tone hopping sequence. The uplink hopping sequences are different between each sector type of a cell and between adjacent cells. Downlink channel information 1540 includes information identifying downlink channel segments that have been assigned by base station 1400 to WT 1500 for use when BS 1400 is transmitting data/information to WT 1500. Downlink channels may include downlink traffic channels and assignment channels, each downlink channel including one or more logical tone, each logical tone following a downlink hopping sequence, which is synchronized between each sector of the cell.

User info 1536 also includes terminal ID information 1542, which is a base station 1400 assigned identification, base station ID information 1544 which identifies the specific base station 1400 that WT has established communications with, and sector ID info 1546 which identifies the specific sector of the cell where WT 1500 is presently located. Base station ID 1544 provides a cell slope value and sector ID info 1546 provides a sector index type; the cell slope value and sector index type may be used to derive tone hopping sequences. Mode information 1548 also included in user info 1536 identifies whether the WT 1500 is in sleep mode, hold mode, or on mode.

Tone subset allocation sequence information 1550 includes downlink strip-symbol time information 1552 and downlink tone information 1554. Downlink strip-symbol time information 1552 include the frame synchronization structure information, such as the superslot, beaconslot, and ultraslot structure information and information specifying whether a given symbol period is a strip-symbol period, and if so, the index of the strip-symbol period and whether the strip-symbol is a resetting point to truncate the tone subset allocation sequence used by the base station. Downlink tone info 1554 includes information including a carrier frequency assigned to the base station 1400, the number and frequency of tones, and the set of tone subsets to be allocated to the strip-symbol periods, and other cell and sector specific values such as slope, slope index and sector type.

Routines 1520 include communications routines 1524 and wireless terminal control routines 1526. Communications routines 1524 control the various communications protocols used by WT 1500. Wireless terminal control routines 1526 control basic wireless terminal 1500 functionality including the control of the receiver 1502 and transmitter 1504. Wireless terminal control routines 1526 include the signaling routine 1528. The signaling routine 1528 includes a cell deriving routine 1530 and a Beacon signal locating routine 1532. Cell ID deriving routine 1530 can determine an identifier of a cell. Further, Beacon signal locating routine 1532 can identify a position of a Beacon signal within a type 1 downlink transmission unit as described herein.

Figure 16:
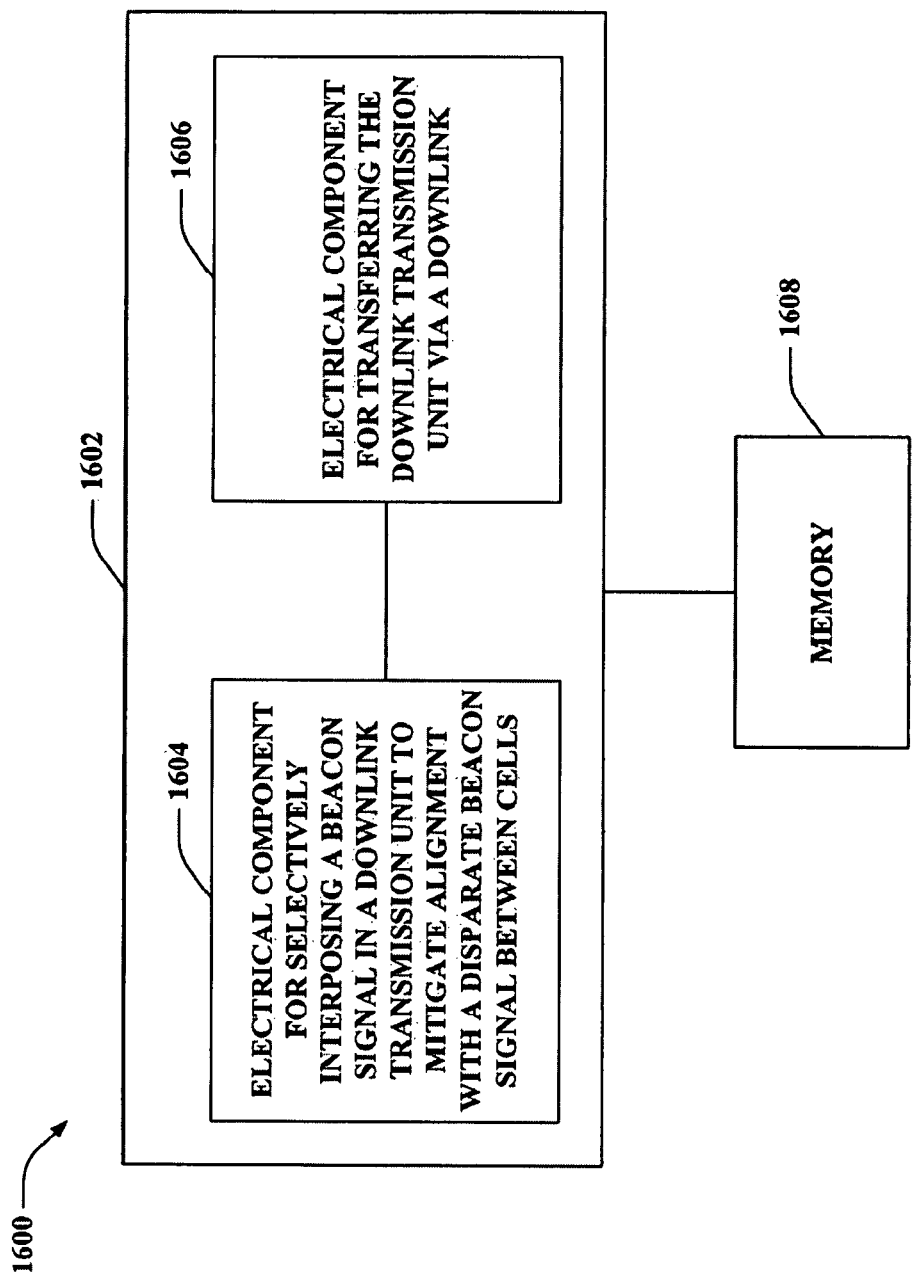
FIG. 16 is an illustration of an example system that generates downlink transmission units in connection with an OFDM TDD environment.

With reference to FIG. 16, illustrated is a system 1600 that generates downlink transmission units in connection with an OFDM TDD environment. For example, system 1600 may reside at least partially within a base station. It is to be appreciated that system 1600 is represented as including functional blocks, which may be functional blocks that represent functions implemented by a processor, software, or combination thereof (e.g., firmware). System 1600 includes a logical grouping 1602 of electrical components that can act in conjunction. For instance, logical grouping 1602 may include an electrical component for selectively interposing a Beacon signal in a downlink transmission unit to mitigate alignment with a disparate Beacon signal between cells 1604. For example, the Beacon signal may be positioned at a location that corresponds to a characteristic (e.g., cell identifier) of a particular cell associated with the downlink transmission unit. By way of illustration, the Beacon signal may be carried by a strip OFDM symbol included in the downlink transmission unit. Moreover, a subset of strip OFDM symbols may include Beacon signals. Further, the strip OFDM symbol may be included at a position abutting a half slot or a non-strip, control OFDM symbol. According to another example, the strip OFDM symbol may be positioned as a function of expected drift. Further, logical grouping 1602 may comprise an electrical component for transferring the downlink transmission unit via a downlink 1606. For example, the downlink transmission unit may be transferred during an allotted time slot within a superslot. Additionally, system 1600 may include a memory 1608 that retains instructions for executing functions associated with electrical components 1604 and 1606. While shown as being external to memory 1608, it is to be understood that one or more of electrical components 1604 and 1606 may exist within memory 1608.

Figure 17:
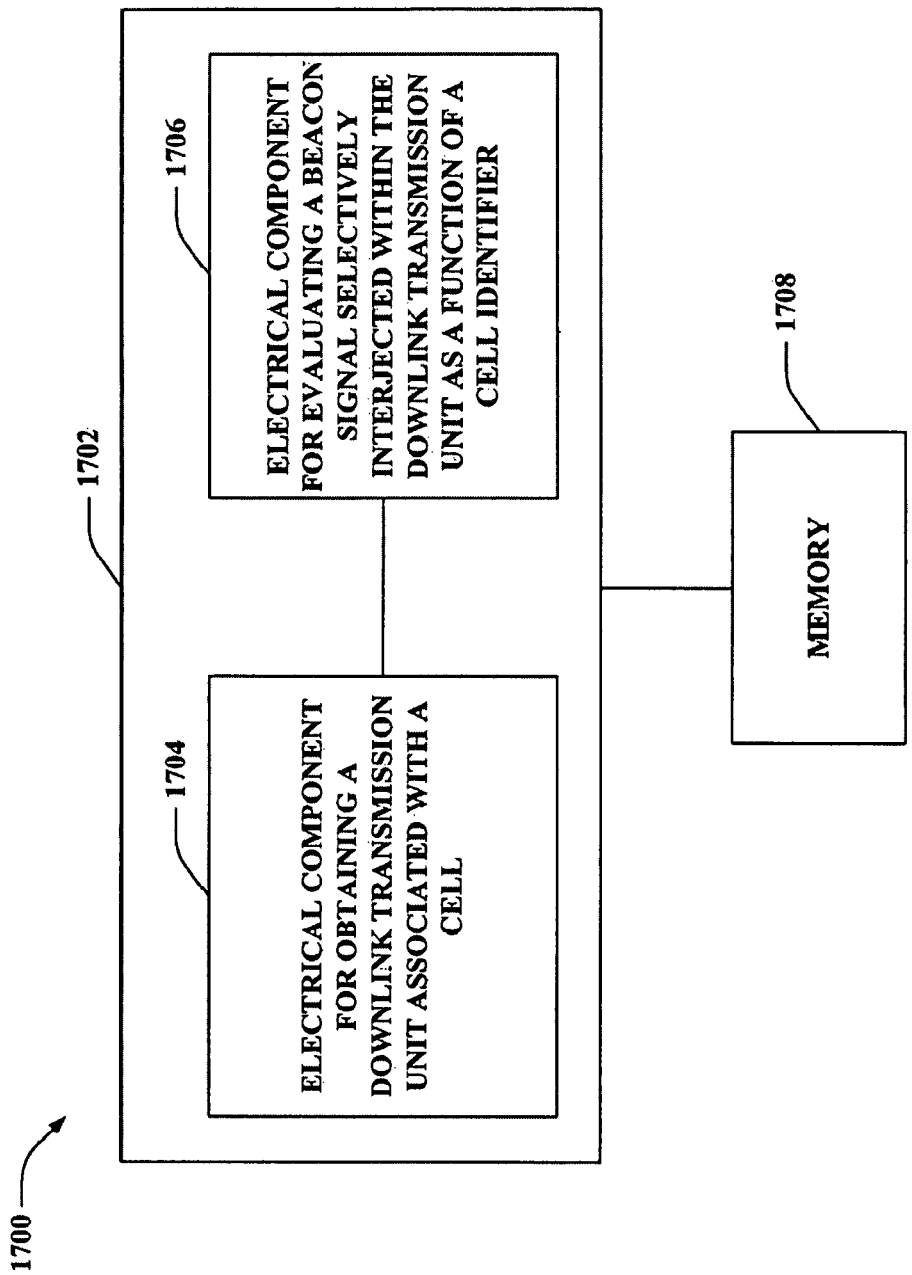
FIG. 17 is an illustration of an example system that employs a downlink transmission unit that includes a Beacon signal in an OFDM TDD environment.

Turning to FIG. 17, illustrated is a system 1700 that employs a downlink transmission unit that includes a Beacon signal in an OFDM TDD environment. System 1700 may reside within a mobile device, for instance. As depicted, system 1700 includes functional blocks that may represent functions implemented by a processor, software, or combination thereof (e.g., firmware). System 1700 includes a logical grouping 1702 of electrical components that facilitate receiving and/or analyzing downlink transmission units. Logical grouping 1702 may include an electrical component for obtaining a downlink transmission unit associated with a cell 1704. For example, the downlink transmission unit may be obtained as well as a disparate downlink transmission unit associated with a disparate cell. Moreover, logical grouping 1702 may include an electrical component for evaluating a Beacon signal selectively interjected within the downlink transmission unit as a function of a cell identifier 1706. Thus, according to the above example whereby a disparate downlink transmission associated with a disparate cell is additionally obtained, Beacon signals of each of the downlink transmission units may be positioned at different time locations; thus, alignment between Beacon signals may be mitigated. Additionally, system 1700 may include a memory 1708 that retains instructions for executing functions associated with electrical components 1704 and 1706. While shown as being external to memory 1708, it is to be understood that electrical components 1704 and 1706 may exist within memory 1708.

It is to be understood that the embodiments described herein may be implemented in hardware, software, firmware, middleware, microcode, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates generating downlink transmission units in an Orthogonal Frequency Division Multiplexing (OFDM) environment, the method comprising operating a base station to:
   selectively position a Beacon signal within a downlink transmission unit based upon a characteristic of a cell in which said base station is located, the Orthogonal Frequency Division Multiplexing (OFDM) environment including OFDM symbols of a first type and traffic OFDM symbols, said OFDM symbols of the first type being used to transmit control signals, the selective positioning of the Beacon signal including locating the Beacon signal in a subset of OFDM symbols of the first type, at a time and frequency location determined based on said characteristic of the cell in which the base station is located; and
   transmit the downlink transmission unit.

2. The method of claim 1, wherein the characteristic is a cell identifier of the cell in which said base station is located.

3. The method of claim 2,
   wherein said cell identifier is locally unique; and
   wherein selectively position a Beacon signal within a downlink transmission unit based upon a characteristic of a cell includes determining the position of the beacon signal within said downlink transmission unit in both time and frequency as a function of said cell identifier.

4. The method of claim 1, wherein the characteristic is a physical layer identifier that is uniquely assigned in a geographic region.

5. The method of claim 1, wherein selectively positioning the Beacon signal further comprises mitigating timing alignment between the Beacon signal and a disparate Beacon signal in a differing downlink transmission unit generated for transfer by a different cell.

6. The method of claim 1, further comprising operating the base station to selectively interpose the Beacon signal based upon expected timing drift.

7. The method of claim 1,
   wherein said OFDM symbols of the first type are strip symbols and wherein selectively positioning the Beacon signal includes locating the Beacon signal in a subset of strip OFDM symbols included in the downlink transmission unit and disparate downlink transmission units associated with the cell.

8. The method of claim 7, further comprising operating the base station to selectively incorporate the Beacon signal in one of eight strip OFDM symbols.

9. The method of claim 7, further comprising operating the base station to selectively locate the strip OFDM symbols in the downlink transmission unit and the disparate downlink transmission units as a function of the characteristic of the cell.

10. The method of claim 1, further comprising operating the base station to identify a subband position for the Beacon signal.

11. The method of claim 1, wherein a time position at which the Beacon signal is selectively positioned varies from a differing time position of a disparate Beacon signal of a disparate cell.

12. The method of claim 1, further comprising operating the base station to employ a tone set in connection with the Beacon signal that differs from a disparate tone set utilized by a disparate sector associated with the cell.

13. The method of claim 1,
   wherein said downlink transmission unit includes strip symbols and non-strip symbols, and
   wherein operating the base station to selectively position a Beacon signal within the downlink transmission unit based upon a characteristic of a cell in which said base station is located includes:
      determining position of a strip symbol within the downlink transmission and determining a frequency location to be used for the Beacon signal within a strip symbol.

14. The method of claim 13,
   wherein the strip symbol in the downlink transmission unit is a symbol used to transmit mainly control signals; and
   wherein non-strip symbols in the downlink transmission unit are used to transmit data.

15. A wireless communications apparatus for use in an Orthogonal Frequency Division Multiplexing (OFDM) environment, comprising:
   a memory that retains instructions for determining a time location for a Beacon signal within a downlink transmission unit based upon a characteristic of a cell in which said wireless communications apparatus is located, the Orthogonal Frequency Division Multiplexing (OFDM) environment including OFDM symbols of a first type and traffic OFDM symbols, said OFDM symbols of the first type being used to transmit control signals, the selective positioning of the Beacon signal including locating the Beacon signal in a subset of OFDM symbols of the first type, at a time and frequency location determined based on said characteristic of the cell in which the wireless communications apparatus is located, determining a subband position for the Beacon signal, and sending the Beacon signal with the time location and the subband position via a downlink; and
   a processor, coupled to the memory, configured to execute the instructions retained in the memory.

16. The wireless communications apparatus of claim 15,
   wherein said downlink transmission unit includes a number of successive OFDM symbols, and
   wherein the memory further retains instructions for determining the time location and the subband position to mitigate alignment with a disparate Beacon signal associated with a disparate cell, and
   wherein determining the time location includes determining a particular one of the successive OFDM symbols in said downlink transmission unit.

17. The wireless communications apparatus of claim 15, wherein the memory further retains instructions for determining the time location and the subband position based upon a cell identifier.

18. The wireless communications apparatus of claim 15, wherein the memory further retains instructions for including the Beacon signal in a subset of selectively positioned strip OFDM symbols.

19. The wireless communications apparatus of claim 15, wherein the memory further retains instructions for determining the time location for the Beacon based upon expected timing drift.

20. The method of claim 15, wherein said downlink transmission unit includes a plurality of frequency subbands, said subband position indicating a position of one of said frequency subbands which is to be used by the cell with said characteristic to communicate the Beacon signal, each subband including at least two tones on which the Beacon signal is to be transmitted at the same time.

21. A wireless communications apparatus that generates downlink transmission units in an OFDM environment, comprising:
means for selectively interposing a Beacon signal in a downlink transmission unit at a location in the downlink transmission unit determined based upon a characteristic of a cell in which said wireless communications device is located to mitigate timing alignment with a disparate Beacon signal between cells, the Orthogonal Frequency Division Multiplexing (OFDM) environment including OFDM symbols of a first type and traffic OFDM symbols, said OFDM symbols of the first type being used to transmit control signals, the selective positioning of the Beacon signal including locating the Beacon signal in a subset of OFDM symbols of the first type, at a time and frequency location determined based on said characteristic of the cell in which the wireless communications apparatus is located; and
means for transferring the downlink transmission unit via a downlink.

22. The wireless communications apparatus of claim 21, further comprising means for identifying a subband position for the Beacon signal.

23. The wireless communications apparatus of claim 21, wherein the Orthogonal Frequency Division Multiplexing (OFDM) environment includes strip OFDM symbols and traffic OFDM symbols, the wireless communications apparatus further comprising means for selectively incorporating the Beacon signal in a subset of selectively positioned strip OFDM symbols.

24. The wireless communications apparatus of claim 21, further comprising means for selectively interposing the Beacon signal as a function of expected timing drift and/or a cell identifier.

25. An apparatus in an Orthogonal Frequency Division Multiplexing (OFDM) environment, comprising:
a processor configured to:
selectively position a Beacon signal within downlink transmission units at a location in the downlink transmission units determined based upon a characteristic of a cell in which said apparatus is located so as to mitigate timing alignment with a disparate Beacon signal associated with a disparate cell, the Orthogonal Frequency Division Multiplexing (OFDM) environment including OFDM symbols of a first type and traffic OFDM symbols, said OFDM symbols of the first type being used to communicate transmit control signals, the selective positioning of the Beacon signal including locating the Beacon signal in a subset of OFDM symbols of the first type, at a time and frequency location determined based on said characteristic of the cell in which the apparatus is located; and
transfer the downlink transmission units over a downlink.

26. A method that facilitates analyzing downlink transmission units in an OFDM environment, comprising:
receiving downlink transmission units from a base station located in a cell;
analyzing a time position of a Beacon signal included in the downlink transmission units;
evaluating a subband position of the Beacon signal; and
determining an identity of the cell based upon the time position and the subband position.

27. The method of claim 26, further comprising:
identifying a beginning and an end of a downlink transmission interval; and
evaluating a location of the Beacon signal within the downlink transmission interval.

28. The method of claim 26,
wherein the time position corresponds to a cell identifier; and
wherein determining an identity of the cell includes determining said cell identifier.

29. A wireless communications apparatus in an Orthogonal Frequency Division Multiplexing (OFDM) environment, comprising:
non-transitory machine readable medium including machine executable instructions, said non-transitory machine readable medium comprising:
instructions for controlling said wireless communications apparatus to determine a time location for a Beacon signal within a downlink transmission unit in the Orthogonal Frequency Division Multiplexing (OFDM) environment, said OFDM environment including OFDM symbols of a first type and traffic OFDM symbols, said OFDM symbols of the first type being used to transmit control signals, the time location of the Beacon signal being a time location of a OFDM symbol in said subset of OFDM symbols of the first type, said determining being based upon a characteristic of a cell in which said wireless communications apparatus is located;
instructions for controlling said wireless communications apparatus to determine a subband position for the Beacon signal within said subset of OFDM symbols of the first type; and
instructions for controlling said wireless communications apparatus to send the Beacon signal with the time location and the subband position within said subset of OFDM symbols of the first type via a downlink.

30. An apparatus for analyzing downlink transmission units in an OFDM environment, comprising:
means for receiving downlink transmission units from a base station located in a cell;
means for analyzing a time position of a Beacon signal included in the downlink transmission units;
means for evaluating a subband position of the Beacon signal; and
means for determining an identity of the cell based upon the time position and the subband position.

31. The apparatus of claim 30, wherein the time position corresponds to a cell identifier.

32. An apparatus for analyzing downlink transmission units in an OFDM environment, comprising:
at least one processor configured to:
receive downlink transmission units from a base station located in a cell;
analyze a time position of a Beacon signal included in the downlink transmission units;
evaluate a subband position of the Beacon signal; and
determine an identity of the cell based upon the time position and the subband position; and
memory coupled to said at least one processor.

33. A communications apparatus for analyzing downlink transmission units in an OFDM environment, comprising:
- non-transitory machine readable medium including machine executable instructions, said non-transitory machine readable medium comprising:
    - instructions for controlling said communications apparatus to receive downlink transmission units from a base station located in a cell;
    - instructions for controlling said communications apparatus to analyze a time position of a Beacon signal included in the downlink transmission units;
    - instructions for controlling said communications apparatus to evaluate a subband position of the Beacon signal; and
    - instructions for controlling said communications apparatus to determine an identity of the cell based upon the time position and the subband position.

* * * * *